US008625717B2

United States Patent
Imamura

(10) Patent No.: US 8,625,717 B2
(45) Date of Patent: *Jan. 7, 2014

(54) WIRELESS TRANSMISSION DEVICE AND WIRELESS TRANSMISSION METHOD

(75) Inventor: Kimihiko Imamura, Vancouver, WA (US)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/823,853

(22) Filed: Jun. 25, 2010

(65) Prior Publication Data

US 2010/0261441 A1 Oct. 14, 2010

Related U.S. Application Data

(62) Division of application No. 12/065,051, filed on Feb. 27, 2008.

(30) Foreign Application Priority Data

Sep. 1, 2005 (JP) .................................. 2005-253194
Dec. 21, 2005 (JP) .................................. 2005-367860

(51) Int. Cl.
*H04L 27/04* (2006.01)
(52) U.S. Cl.
USPC .............................. 375/299; 375/247; 375/249
(58) Field of Classification Search
USPC ........................... 375/299, 347, 267, 247, 249
See application file for complete search history.

(56) References Cited

U.S. PATENT DOCUMENTS

| 4,856,025 | A | * | 8/1989 | Takai ............................. 375/267 |
| 5,991,331 | A | | 11/1999 | Chennakeshu et al. |
| 6,034,987 | A | | 3/2000 | Chennakeshu et al. |
| 6,131,016 | A | | 10/2000 | Greenstein et al. |
| 6,160,510 | A | | 12/2000 | Busking et al. |
| 6,249,250 | B1 | | 6/2001 | Namekata et al. |
| 6,650,910 | B1 | | 11/2003 | Mazur et al. |
| 6,731,619 | B1 | | 5/2004 | Ramesh et al. |
| 6,807,145 | B1 | | 10/2004 | Weerackody et al. |
| 6,842,487 | B1 | | 1/2005 | Larsson |

(Continued)

FOREIGN PATENT DOCUMENTS

| CA | 2275283 C | 12/2006 |
| CN | 1320308 A | 10/2001 |

(Continued)

OTHER PUBLICATIONS

3GPP, R1-050590, "Physical Channels and Multiplexing in Evolved UTRA Downlink," Aug. 17, 2005, Internet <URL:ftp://ftp.3gpp.org/TSG_RAN/WG1_RL1/R1_Ad_Hocs/LTE_AH_June-05/Docs/R1-050590.zip>.

(Continued)

Primary Examiner — Qutbuddin Ghulamali
(74) Attorney, Agent, or Firm — Slater & Matsil, L.L.P.

(57) ABSTRACT

A wireless transmission device of the present invention includes n (where n is an integer of two or more) transmission antennas and a delay imparting section for delaying transmission signals supplied to the n transmission antennas by a maximum delay time (n−1)T or less based on a delay time T dependent upon a communication signal, which indicates whether to transmit the transmission signals by way of frequency diversity or multiuser diversity.

20 Claims, 18 Drawing Sheets

(56) References Cited

U.S. PATENT DOCUMENTS

| | | | |
|---|---|---|---|
| 6,862,456 B2 | 3/2005 | Sugar et al. | |
| 6,892,059 B1 | 5/2005 | Kim et al. | |
| 6,980,612 B1 | 12/2005 | Miyoshi | |
| 7,002,939 B1 | 2/2006 | Hiramatsu | |
| 7,065,156 B1 | 6/2006 | Kuchi | |
| 7,277,469 B2 | 10/2007 | Brunel | |
| 7,298,797 B2 | 11/2007 | Hwang et al. | |
| 7,436,903 B2 | 10/2008 | Sandhu et al. | |
| 7,672,388 B2 | 3/2010 | Frank | |
| 7,792,206 B2* | 9/2010 | Ylitalo et al. | 375/267 |
| 2002/0186785 A1 | 12/2002 | Hoshino et al. | |
| 2003/0086371 A1* | 5/2003 | Walton et al. | 370/235 |
| 2003/0099216 A1 | 5/2003 | Nilsson et al. | |
| 2003/0148738 A1 | 8/2003 | Das et al. | |
| 2003/0169682 A1 | 9/2003 | Chen et al. | |
| 2004/0038651 A1* | 2/2004 | Okuhata | 455/130 |
| 2004/0137948 A1 | 7/2004 | Benning et al. | |
| 2004/0235433 A1 | 11/2004 | Hugl et al. | |
| 2004/0266354 A1 | 12/2004 | Hamada et al. | |
| 2005/0048933 A1 | 3/2005 | Wu et al. | |
| 2005/0113041 A1 | 5/2005 | Polley et al. | |
| 2005/0141641 A1 | 6/2005 | Tanaka et al. | |
| 2005/0220199 A1 | 10/2005 | Sadowsky et al. | |
| 2005/0254592 A1 | 11/2005 | Naguib et al. | |
| 2005/0281240 A1 | 12/2005 | Oh et al. | |
| 2006/0057969 A1 | 3/2006 | Van Houtum | |
| 2006/0068791 A1 | 3/2006 | Lindoff | |
| 2006/0120473 A1 | 6/2006 | Baum | |
| 2006/0146721 A1* | 7/2006 | Attar et al. | 370/238 |
| 2006/0239226 A1 | 10/2006 | Khan | |
| 2006/0270433 A1 | 11/2006 | Kelton et al. | |
| 2006/0274854 A1 | 12/2006 | Matsumoto et al. | |
| 2007/0071127 A1 | 3/2007 | Gore et al. | |
| 2009/0081967 A1 | 3/2009 | Imamura | |
| 2009/0135940 A1 | 5/2009 | Imamura | |
| 2009/0279589 A1 | 11/2009 | Nguyen | |

FOREIGN PATENT DOCUMENTS

| | | |
|---|---|---|
| CN | 1338162 A | 2/2002 |
| CN | 1358357 A | 7/2002 |
| EP | 1 605 607 A1 | 12/2005 |
| JP | 56-140729 A | 11/1981 |
| JP | 11-88030 A | 3/1999 |
| JP | 11-205026 A | 7/1999 |
| JP | 2000-209017 A | 7/2000 |
| JP | 2005-191997 A | 7/2005 |
| WO | WO 02/07341 A2 | 1/2002 |
| WO | WO 2005/041441 A1 | 5/2005 |

OTHER PUBLICATIONS

G. Auer: "Channel Estimation by Set Partitioning for OFDM with Cyclic delay Diversity", 2004 IEEE 60th Vehicular Technology Conference. VTC2004-FALL—Sep. 26-29, 2004—Los Angeles, CA, USA, IEEE—Piscataway, NJ, USA LNKD-DOI: 10.1109/VETECF. 2004.1400092, vol. 1, pp. 669-673, XP010788461, ISBN: 978-0-7803-8521-4.

G. Bauch et al.: "Orthogonal Frequency Division Multiple Access with Cyclic Delay Diversity", 2004 ITG Worshop On Smart Antennas, Munich, Germany, Mar. 18-19, 2004, Piscataway, NJ, USA, IEEE, LNKD-DOI: 10.1109/WSA.2004.1407642, Mar. 18, 2004, pp. 17-24, XP010780073 ISBN: 978-0-7803-8327-2.

Institute for Infocomm Research, NTT DoCoMo, Intra-Node B Macro Diversity based on Cyclic Delay Transmissions, 3GPP TSG RAN WG1 #42 on LTE R1-050795, Sep. 2, 2005, Internet <URL:http://www.3gpp.org/ftp/tsg_ran/WG1_RL1/TSGR1_42/Docs/R1-050795.zip>.

NTT Docomo et al: "Physical Channels and Multiplexing in Evolved UTRA Downlink", 3GPP Draft; R1-050707 Downlink Physical Cahnnel Multiplexing, 3rd Generation Partnership Project (3GPP), Mobile Competence Centre; 650, Route Des Lucioles: F-06921 Sophia-Antipolis Cedex; France, Aug. 25, 2005, XP050100357.

NTT DoCoMo Inc., Downlink Multiple Access Scheme for Evolved UTRA, 3GPP TSG RAN WG Meeting #40bis R1-050249, Apr. 8, 2005, Internet <URL:http://www.3gpp.org/ftp/tsg_ran/WG1_RL1/TSGR1/40bix/Docs/R1-050249.zip>.

Dammann et al., "Transmit/Receive-Antenna Diversity Techniques for OFDM Systems", European Transactions on Telecommunications, Wiley & Sons, Chichester, GB, vol. 13, No. 5, Sep. 1, 2001, pp. 531-538, XP002348091, ISSN: 1124-318X.

Office Action dated Jan. 18, 2011 for U.S. Appl. No. 12/692,986.

U.S. Notice of Allowance issued in U.S. Appl. No. 12/326,581 on Jun. 20, 2011.

U.S. Notice of Allowance issued in U.S. Appl. No. 12/642,667 on Jul. 14, 2011.

Search Report dated Jan. 21, 2011 for European Application No. 06797294.3.

Ericsson, R1-050765, "Some aspects of single-carrier transmission for E-UTRA", 3GPP TSG RAN WG1 Meeting #42, London UK, Aug. 29-Sep. 2, 2005.

Office Action dated Mar. 14, 2011 for U.S. Appl. No. 12/065,051.

Office Action dated Mar. 8, 2011 for U.S. Appl. No. 12/642,667.

Office Action dated Mar. 9, 2011 for U.S. Appl. No. 12/326,557.

Office Action dated Mar. 9, 2011 for U.S. Appl. No. 12/326,581.

Samsung, R1-050888, "Enhanced Frequency Diversity and Scheduling Performance in Evolved UTRA", 3GPP TSG RAN WG1, Meeting #42, London, UK, Aug. 29-Sep. 2, 2005.

Samsung, R1-051046, "Further details on Adaptive Cyclic Delay Diversity Scheme", 3GPP TSG RAN WG1, Meeting #42bis, San Diego, USA, Oct. 10-14, 2005.

Samsung, R1-051047, "System Performance of Adaptive Cyclic Delay Diversity Scheme", 3GPP TSG RAN WG1 Meeting #42bis, San Diego, USA, Oct. 10-14, 2005.

Notice of Allowance dated Mar. 22, 2011 for U.S. Appl. No. 12/693,058.

Office Action dated Mar. 28, 2011 for U.S. Appl. No. 12/823,886.

U.S. Notice of Allowance issued in U.S. Appl. No. 12/693,058 on Jul. 13, 2011.

U.S. Office Action issued in U.S. Appl. No. 12/326,568 on Jul. 13, 2011.

U.S. Office Action issued in U.S. Appl. No. 12/089,361 on Dec. 2, 2011.

U.S. Notice of Allowance issued in U.S. Appl. No. 12/092,048 on Mar. 7, 2013.

U.S. Notice of Allowance issued in U.S. Appl. No. 12/065,051 on Sep. 12, 2011.

U.S. Notice of Allowance issued in U.S. Appl. No. 12/692,986 on Oct. 12, 2011.

U.S. Office Action issued in U.S. Appl. No. 12/092,048 on Oct. 15, 2012.

U.S. Notice of Allowance issued in U.S. Appl. No. 12/326,557 on Oct. 25, 2011.

U.S. Notice of Allowance issued in U.S. Appl. No. 12/326,568 on Oct. 31, 2011.

U.S. Office Action issued in U.S. Appl. No. 12/823,886 on Oct. 19, 2011.

U.S. Notice of Allowance issued in U.S. Appl. No. 12/823,886 on Mar. 2, 2012.

U.S. Office Action issued in U.S. Appl. No. 12/092,048 on Mar. 2, 2012.

U.S. Notice of Allowance issued in U.S. Appl. No. 12/326,557 on Sep. 22, 2011.

U.S. Office Action, dated May 16, 2011, for U.S. Appl. No. 12/692,986.

U.S. Office Action, dated May 6, 2011, for U.S. Appl. No. 12/823,886.

U.S. Office Action issued in U.S. Appl. No. 12/089,361 on Sep. 24, 2012.

* cited by examiner

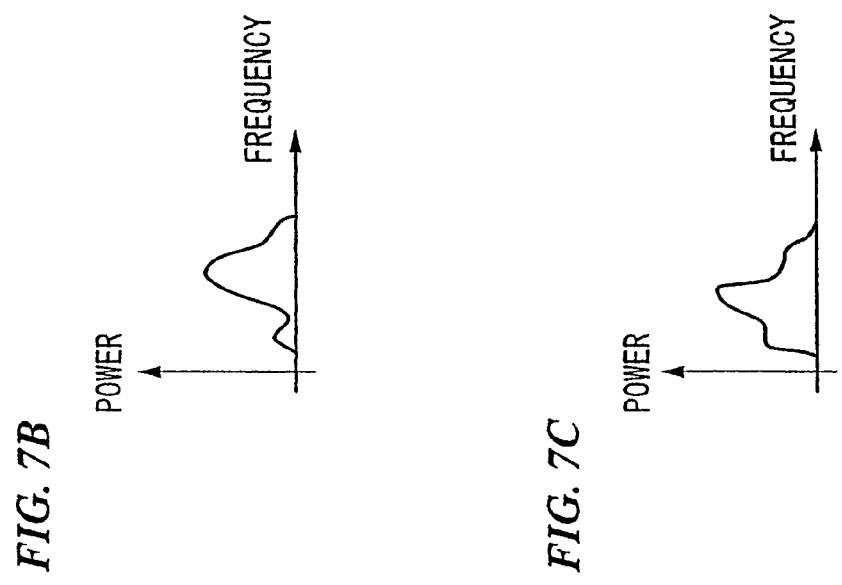
FIG. 7B
FIG. 7C
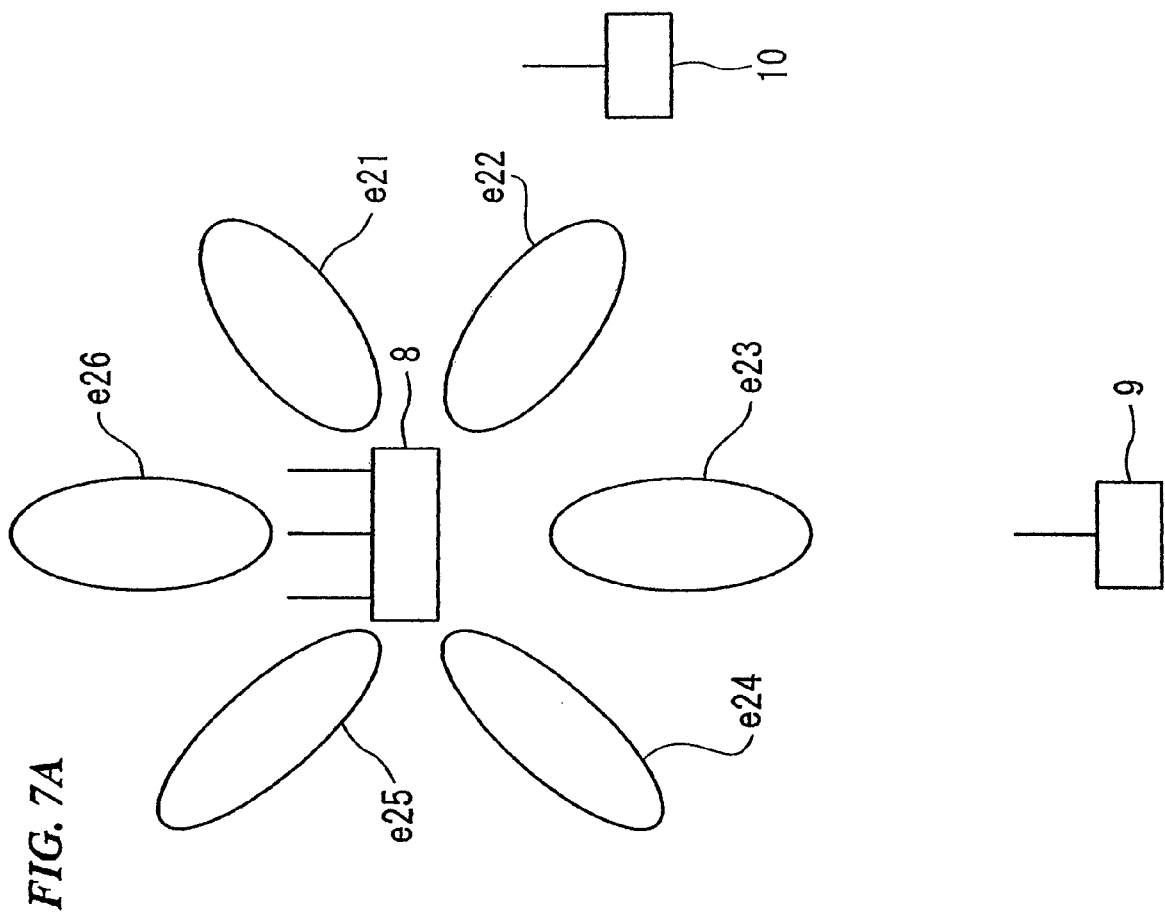
FIG. 7A

FIG. 14

| | FREQUENCY DIVERSITY REGION | MULTIUSER DIVERSITY REGION |
|---|---|---|
| COMMON PILOT CHANNEL | $(n-1)T<1/Fc$ | $(n-1)T<1/Fc$ |
| DEDICATED PILOT CHANNEL | $(n-1)T>1/Fc$ | $(n-1)T<1/Fc$ OR WEIGHT $W_m$ |
| DOWNLINK SYNCHRONIZATION CHANNEL | $(n-1)T>1/Fc$ | $(n-1)T>1/Fc$ |
| COMMON CONTROL CHANNEL | $(n-1)T<1/Fc$ | $(n-1)T<1/Fc$ |
| DEDICATED CONTROL CHANNEL | $(n-1)T<1/Fc$ | $(n-1)T<1/Fc$ |
| MULTICAST/BROADCAST CHANNEL | $(n-1)T>1/Fc$ | - |

FIG. 15

| | FREQUENCY DIVERSITY REGION | MULTIUSER DIVERSITY REGION |
|---|---|---|
| COMMON PILOT CHANNEL | $(n-1)T>1/Fc$ | $(n-1)T<1/Fc$ |
| DEDICATED PILOT CHANNEL | $(n-1)T>1/Fc$ | $(n-1)T<1/Fc$ OR WEIGHT Wm |
| DOWNLINK SYNCHRONIZATION CHANNEL | $(n-1)T>1/Fc$ | $(n-1)T>1/Fc$ |
| COMMON CONTROL CHANNEL | $(n-1)T>1/Fc$ | $(n-1)T<1/Fc$ |
| DEDICATED CONTROL CHANNEL | $(n-1)T>1/Fc$ | $(n-1)T<1/Fc$ |
| MULTICAST/BROADCAST CHANNEL | $(n-1)T>1/Fc$ | — |

WIRELESS TRANSMISSION DEVICE AND WIRELESS TRANSMISSION METHOD

This application is a Divisional application Ser. No. 12/065,051, filed on Feb. 27, 2008, and claims priority under 35 U.S.C. §119(a) to Patent Application No. 2005-253194 filed in Japan on Sep. 1, 2005 and Patent Application No. 2005-367860 filed in Japan on Dec. 21, 2005, all of which are hereby expressly incorporated by reference into the present application.

TECHNICAL FIELD

The present invention relates to wireless transmission devices and wireless transmission methods and in particular to wireless transmission devices and wireless transmission methods for transmitting signals to wireless reception devices by use of plural transmission antennas.

The present application claims priorities on Japanese Patent Application No. 2005-253194 filed in Japan on Sep. 1, 2005 and Japanese Patent Application No. 2005-367860 filed in Japan on Dec. 21, 2005, the contents of which are incorporated herein by reference.

BACKGROUND ART

Recently, there are provided methods, mainly adapted to multicarrier transmission systems, in which a plurality of blocks are divided along frequency and time axes and which perform scheduling on signals transmitted to users from wireless transmission devices in units of blocks. Herein, regions that are secured for users to perform communications and that are defined along the frequency and time axes are referred to as assignment slots, and blocks serving as the basis for determining assignment slots are referred to as chunks.

In the above, there are provided methods that, in order to transmit broadcast signals, multicast signals, and control signals, blocks whose ranges are broadened in the frequency axis direction are assigned so as to produce frequency diversity effects, thus reducing errors irrespective of low reception power. In addition, there are provided methods that, in order to transmit unicast signals in one-to-one communications between wireless transmission devices and wireless reception devices, blocks whose ranges are reduced in the frequency axis direction are assigned so as to produce multiuser diversity effects, thus improving reception power in wireless reception devices.

FIGS. 16A and 16B show the relationships regarding signals transmitted from a wireless transmission device to a wireless reception device with respect to time (horizontal axis) and frequency (vertical axis). In FIG. 16A, the horizontal axis represents time, and the vertical axis represents frequency. Transmission times $t_1$ to $t_3$ are set to the time axis. Herein, the same time length is set to the times $t_1$ to $t_3$ respectively. Transmission frequencies $f_1$ to $f_5$ are set to the frequency axis. Herein, a same frequency range $F_c$ is set to the frequencies $f_1$ to $f_5$. With reference to the transmission times $t_1$ to $t_3$ and the transmission frequencies $f_1$ to $f_5$, fifteen chunks $K_1$ to $K_{15}$ are set as shown in FIG. 16A.

Furthermore, five chunks $K_1$ to $K_5$ are connected as shown in FIG. 16B and are then equally divided into six slots along the time axis, thus setting communication slots $s_1$ to $s_6$ each of which has a time length of $t_1/6$ and a frequency range of $5f_1$. The communication slots $s_1$ and $s_4$ are assigned to a first user; the communication slots $s_2$ and $s_5$ are assigned to a second user; and the communication slots $s_3$ and $s_6$ are assigned to a third user. This makes it possible for the first to third users to obtain frequency diversity effects.

Next, the chunk $K_{10}$ is assigned to a fourth user as a communication slot $s_{11}$. The chunks $K_7$, $K_8$, and $K_9$ are connected so as to form communication slots $s_8$ to $s_{10}$, each of which has a time length of $t_2$ and a frequency range of $3f_1$ and which are assigned to a fifth user. Furthermore, the chunk $K_6$ is assigned to a sixth user as a communication slot $s_7$. This makes it possible for the fourth to sixth users to obtain multiuser diversity effects, and this makes it possible for the fifth user to obtain a frequency diversity effect.

Furthermore, the chunk $K_{11}$ is assigned to a seventh user as a communication slot $s_{12}$. This makes it possible for this user to obtain a multiuser diversity effect. Furthermore, the chunks $K_{13}$ and $K_{15}$ are assigned to an eighth user as communication slots $s_{19}$ and s26. This makes it possible for this user to obtain a multiuser diversity effect.

Furthermore, the two chunks $K_{12}$ and $K_{14}$ are equally divided into six slots, thus forming slots $s_{13}$ to $s_{18}$ and $s_{20}$ to $s_{25}$. The communication slots $s_{13}$, $s_{16}$, $s_{20}$, and $s_{23}$ are assigned to a ninth user; the communication slots $s_{14}$, $s_{17}$, $s_{21}$, and $s_{24}$ are assigned to a tenth user; and the communication slots $s_{15}$, $s_{18}$, $s_{22}$, and $s_{25}$ are assigned to an eleventh user. This makes it possible for the ninth to eleventh users to obtain frequency diversity effects individually.

Non-patent document 1: Contribution to 3GPP, R1-050249, "Downlink Multiple Access Scheme for Evolved UTRA", [Retrieval on Aug. 17, 2005], Internet (URL: ftp://ftp.3gpp.org/TSG_RAN/WG1_RL1/TSGR1_40bis/Docs/R1-050249.zip)

Non-patent document 2: Contribution to 3GPP, R1-050590, "Physical Channels and Multiplexing in Evolved UTRA Downlink", [Retrieval on Aug. 17, 2005], Internet (URL: ftp://ftp.3gpp.org/TSG_RAN/WG1_RL1/R1_Ad_Hocs/LTE_AH_June-05/Docs/R1-050590.zip)

DISCLOSURE OF INVENTION

Problems to be Solved by the Invention

In order to obtain frequency diversity effects in the aforementioned conventionally-known methods, it is necessary to increase spread coefficients or to reduce coding coefficients in error correcting coding in response to frequency variations of transfer functions in propagation paths.

FIGS. 17A and 17B and FIGS. 18A and 18B are graphs showing delay profiles and transfer functions with regard to signals that are propagated through plural propagation paths having different delay times so as to reach wireless reception devices.

FIGS. 17A and 18A show delay profiles showing transmission signals, which are propagated through plural propagation paths so as to reach a wireless reception device, with respect to time (horizontal axis) and power (vertical axis). FIGS. 17B and 18B show transfer functions for performing frequency conversion on delay profiles with respect to frequency (horizontal axis) and power (vertical axis).

FIG. 17A shows the appearance of six delay waveforms w11 to w16, and FIG. 18A shows the appearance of three delay waveforms w21 to w23. They differ from each other with respect to maximum delay times t1 and t2.

When the maximum delay time t1 is long as shown in FIGS. 17A and 17B, i.e., when relatively rapid frequency variations (rapid power variations in the frequency direction) occur in the transfer function, it is expected to produce an adequate frequency diversity effect irrespective of a small spread coefficient and a high coding coefficient in error correcting coding. However, when the maximum delay time t2 is small as shown in FIGS. 18A and 18B, i.e., when relatively moderate frequency variations occur in the transfer function, it is not expected to produce an adequate frequency diversity effect when the spread coefficient is small and the coding coefficient in error correcting coding is high; hence, it is necessary to increase the spread coefficient and to reduce the coding coefficient in error correcting coding.

D1 and D2 in FIG. 17B and FIG. 18B show signals, i.e., data. That is, in FIG. 17B, a spread ratio of the spectrum spreading technology is set to "4" with respect to data D1 and D2, thus assigning four sub-carriers $a_{11}$ to $a_{14}$ to the data D1. Similarly, four sub-carriers $a_{15}$ to $a_{18}$ are assigned to the data D2. In this case, the transfer function has rapid frequency variations; hence, reception power of the sub-carrier $a_{13}$ regarding the data D1 remarkably decreases, so that reception power of the sub-carrier $a_{16}$ regarding the data D2 remarkably decreases as well. Therefore, no reception failure occurs with respect to the data D1 and D2.

In FIG. 18B, the spread ratio is set to "8" so as to assign eight sub-carriers $a_{21}$ to $a_{28}$ to the data D1. In this case, the transfer function has slow frequency variations so that the reception power of the sub-carrier $a_{24}$ remarkably decreases, and the reception power of the sub-carriers $a_{23}$ and $a_{25}$ slightly decreases, whereas the data spreading ratio is increased compared with the case of FIG. 17B so that no reception failure occurs with respect to the data D1. The aforementioned values of the spread ratios are described for the sake of convenience and are not necessarily limited.

The present invention is made in consideration of the aforementioned circumstances, wherein it is an object of the invention to provide a wireless transmission device and a wireless transmission method that can produce an adequate frequency diversity effect without controlling a spread coefficient and a coding coefficient in error correcting coding in the wireless transmission side.

Means for Solving the Problem

In a first aspect of the present invention, a wireless transmission device includes n (where n is an integer of two or more) transmission antennas and a delay imparting section for delaying transmission signals supplied to the n transmission antennas by a maximum delay time (n−1)T or less with reference to a delay time T dependent upon a communication signal for communicating whether the transmission signals are subjected to frequency diversity transmission or multiuser diversity transmission.

In the wireless transmission device according to the first aspect, the delay imparting section supplies transmission signals to only the jth (where j is an integer, 1≤j<n) transmission antenna within the n transmission antennas when the communication signal indicates the multiuser diversity.

In the wireless transmission device according to the first aspect, in which a chunk, which is a basic region secured by the user to perform communication and which is used to form regions defined by the frequency axis and time axis, has a frequency bandwidth $F_c$, the delay imparting section sets the delay time T such that the maximum delay time (n−1)T between transmission antennas falls within a range of (n−1)T>1/$F_c$ when the communication signal indicates the frequency diversity, while the delay imparting section sets the delay time T such that the maximum delay time (n−1)T between transmission antennas falls within a range of (n−1)T<1/$F_c$ when the communication signal indicates the multiuser diversity.

In the wireless transmission device according to the first aspect, in which a chunk, which is a basic region secured by the user to perform communication and which is used to form regions defined by the frequency axis and time axis, has a frequency bandwidth $F_c$ and a communication slot assigned to the user has a bandwidth BW, the delay imparting section sets the delay time T such that the maximum delay time (n−1)T between transmission antennas falls within a range of (n−1)T>1/BW when the communication signal indicates the frequency diversity, while the delay imparting section sets the delay time T such that the maximum delay time (n−1)T between transmission antennas falls within a range of (n−1)T<1/$F_c$ when the communication signal indicates the multiuser diversity.

In the wireless transmission device according to the first aspect, the delay imparting section includes user-dependent signal processors, which perform processing for changing the delay time T with respect to n antennas individually in response to the communication result of the communication signal, which performs modulation processing in units of transmission signals with respect to users individually, and each of which has n sets of delay imparting portions, and antenna-dependent signal processors, which mixes signals output from the user-dependent signal processors in units of n antennas.

In the wireless transmission device according to the first aspect, the delay imparting section includes user-dependent signal processors, which perform processing for changing a circulating delay time with respect to n antennas individually in response to the communication result of the communication signal, which performs modulation processing in units of transmission signals with respect to users individually, and which has n sets of delay imparting portions, and antenna-dependent signal processors, which mixes signals output from the user-dependent signal processors in units of n antennas.

The wireless transmission device according to the first aspect includes user-dependent signal processors for performing modulation processing in units of transmission signals with respect to users individually, a sub-carrier assignment section, which assigns sub-carriers to signals output from the user-dependent signal processors in accordance with sub-carrier assignment signals, and antenna-dependent signal processors for performing signal processing on signals output from the sub-carrier assignment section in units of n transmission antennas; and the delay imparting section includes a phase rotation section for applying prescribed values of phase rotation to sub-carriers individually in response to the communication result of the communication signal and an IFFT section for performing frequency-time conversion.

A wireless transmission device according to a second aspect of the present invention includes n (where n is an integer of two or more) transmission antennas and a delay imparting and directivity control section, which delays transmission signals supplied to the n transmission antennas by a maximum delay time (n−1)T or less when a communication signal, which communicates whether transmission signals are subjected to frequency diversity transmission or multiuser diversity transmission, indicates frequency diversity and performs weighted multiplication so as to control directivity when the communication signal indicates multiuser diversity.

The wireless transmission device according to the second aspect of the present invention further includes user-dependent signal processors for performing modulation processing in units of transmission signals with respect to users individually, a sub-carrier assignment section for assigning sub-carriers to signals output from the user-dependent signal processors in accordance with sub-carrier assignment signals, and a weight calculation section for calculating weights so as to control directivity, wherein the delay imparting and directivity control section includes a weighted multiplication section for applying prescribed values of phase rotation to sub-carriers individually when the communication signal indicates the frequency diversity with respect to signals output from the sub-carrier assignment section and for performing multiplication using weights output from the weighted operation section when the communication signal indicates the multiuser diversity and an IFFT section for performing frequency-time conversion.

In the wireless transmission device according to the second aspect of the present invention, in which a chunk, which is a basic region secured by the user to perform communication and which is used to form regions defined by the frequency axis and time axis, has a frequency bandwidth $F_c$, the delay imparting and directivity control section sets the delay time T such that the maximum delay time (n−1)T between transmission antennas falls within a range of $(n-1)T > 1/F_c$ when the communication signal indicates frequency diversity, while it sets the delay time T such that the maximum delay time (n−1)T between transmission antennas falls within a range of $(n-1)T < 1/F_c$ when the communication signal indicates multiuser diversity.

In the wireless transmission device according to the second aspect of the present invention, in which a chunk, which is a basic region secured by the user to perform communication and which is used to form regions defined by the frequency axis and time axis, has a frequency bandwidth $F_c$ and a communication slot assigned to a user has a bandwidth BW, the delay imparting and directivity control section sets the delay time T such that the maximum delay time (n−1)T between transmission antennas falls within a range of $(n-1)T > 1/BW$ when the communication signal indicates frequency diversity, while it sets the delay time T such that the maximum delay time (n−1)T between transmission antennas falls within a range of $(n-1)T < 1/F_c$ when the communication signal indicates multiuser diversity.

A wireless transmission device according to a third aspect of the present invention includes n (where n is an integer of two or more) transmission antennas and a delay imparting and directivity control section for performing weighted multiplication so as to perform directivity control or for delaying transmission signals supplied to the n transmission antennas by a maximum delay time (n−1)T or less.

In the wireless transmission device according to the third aspect of the present invention, in response to a communication signal for indicating whether transmission signals are subjected to frequency diversity transmission or multiuser diversity transmission, the delay imparting and directivity control section delays transmission signals supplied to n transmission antennas by the maximum delay time (n−1)T or less when the communication signal indicates frequency diversity, while when the communication signal indicates multiuser diversity, it performs weighted multiplication so as to perform directivity control, or it delays transmission signals supplied to n transmission antennas by the maximum delay time (n−1)T or less.

The wires transmission device according to the third aspect of the present invention further includes user-dependent signal processors for performing modulation processing in units of transmission signals with respect to users individually, a sub-carrier assignment section for assigning sub-carriers to signals output from the user-dependent signal processors in accordance with sub-carrier signals, and a weight calculation section for calculating weights so as to perform directivity control, wherein the delay imparting and directivity control section includes a weighted multiplication section, which applies prescribed values of phase rotation to signals output from the sub-carrier assignment section with respect to sub-carriers individually when the communication signal indicates the frequency diversity, and which performs multiplication using weights output from the weight calculation section and applies prescribed values of phase rotation with respect to sub-carriers when the communication signal indicates the multiuser diversity, and an IFFT section for performing frequency-time conversion with respect to signals output from the weighted multiplication section.

In the wireless transmission device according to the third aspect of the present invention, in which a chunk, which is a basic region secured by the user to perform communication and which is used to form regions defined by the frequency axis and time axis, has a frequency bandwidth $F_c$, the delay imparting and directivity control section sets the delay time T such that the maximum delay time (n−1)T between transmission antennas falls within a range of $(n-1)T > 1/F_c$ when the communication signal indicates the frequency diversity, while it sets the delay time T such that the maximum delay time (n−1)T between transmission antennas falls within a range of $(n-1)T < 1/F_c$ when the communication signal indicates the multiuser diversity and prescribed values of phase rotation are applied with respect to sub-carriers individually.

In the wireless transmission device according to the third aspect of the present invention, in which a chunk, which is a basic region secured by the user to perform communication and which is used to form regions defined by the frequency axis and time axis, has a frequency bandwidth $F_c$, and a communication slot assigned to the user has a bandwidth BW, the delay imparting and directivity control section sets the delay time T such that the maximum delay time (n−1)T between transmission antennas falls within a range of $(n-1)T > 1/BW$ when the communication signal indicates frequency diversity, while it sets the delay time T such that the maximum delay time (n−1)T between transmission antennas falls within a range of $(n-1)T < 1/F_c$ when the communication signal indicates multiuser diversity and prescribed values of phase rotation are applied with respect to sub-carriers individually.

A wireless transmission device according to a fourth aspect of the present invention includes n (where n is an integer of two or more) transmission antennas and a delay imparting section for delaying transmission signals supplied to the n transmission antennas by a maximum delay time (n−1)T or less, wherein the delay imparting section sets the delay time T such that the maximum delay time (n−1)T falls within a range of $(n-1)T < 1/F_c$ when the transmission antennas transmit a common pilot signal; it sets the delay time T such that the maximum delay time (n−1)T falls within a range of $(n-1)T > 1/F_c$ when a communication signal, which indicates whether a chunk including the common pilot signal is subjected to frequency diversity transmission or multiuser diversity transmission, indicates frequency diversity; and it sets the delay time T such that the maximum delay time (n−1)T falls within a range of $(n-1)T < 1/F_c$ when the communication signal indicates multiuser diversity.

A wireless transmission device according to a fifth aspect of the present invention includes n (where n is an integer of two or more) transmission antennas and a delay imparting section for delaying transmission signals supplied to the n transmission antennas by a maximum delay time (n−1)T or less, wherein the delay imparting section sets the delay time T such that the maximum delay time (n−1)T falls within a range of $(n-1)T > 1/F_c$ when a communication signal, which indicates whether a chunk including an individual pilot channel is subjected to frequency diversity transmission or multiuser diversity transmission, indicates frequency diversity, while it sets the delay time T such that the maximum delay time (n−1)T falls within a range of (n−1)T<1/$F_c$ when the communication signal indicates multiuser diversity.

A wireless transmission device according to a sixth aspect of the present invention includes n (where n is an integer of two or more) transmission antennas and a delay imparting section for delaying transmission signals supplied to the n transmission antennas by a maximum delay time (n−1)T or less, wherein when the transmission antennas transmit individual pilot signals, the delay imparting section sets the delay time T such that the maximum delay time (n−1)T falls within a range of (n−1)T>1/$F_c$ when a communication signal, which indicates whether a chunk including an individual pilot channel is subjected to frequency diversity transmission or multiuser diversity transmission, indicates frequency diversity, while it performs directivity control using weights output from the weight calculation section when the communication signal indicates multiuser diversity.

A wireless transmission device according to a seventh aspect of the present invention includes n (where n is an integer of two or more) transmission antennas and a delay imparting section for delaying transmission signals supplied to the n transmission antennas by a maximum delay time (n−1)T or less, wherein when the transmission antennas transmit individual pilot signals, the delay imparting section sets the delay time T such that the maximum delay time (n−1)T falls within a range of (n−1)T>1/$F_c$ when a communication signal, which indicates whether a chunk including an individual pilot channel is subjected to frequency diversity transmission or multiuser diversity transmission, indicates frequency diversity, while it performs directivity control using weights output from the weight calculation section, or it sets the delay time T such that the maximum delay time (n−1)T falls within a range of (n−1)T<1/$F_c$ when the communication signal indicates multiuser diversity.

A wireless transmission device according to an eighth aspect of the present invention includes n (where n is an integer of two or more) transmission antennas and a delay imparting section for delaying transmission signals supplied to the n transmission antennas by a maximum delay time (n−1)T or less, wherein the delay imparting section sets the delay time T such that the maximum delay time (n−1)T falls within a range of (n−1)T>1/$F_c$ when the transmission antennas transmit synchronization signals.

A wireless transmission device according to a ninth aspect of the present invention includes n (where n is an integer of two or more) transmission antennas and a delay imparting section for delaying transmission signals supplied to the n transmission antennas by a maximum delay time (n−1)T or less, wherein the delay imparting section sets the same maximum delay time as a common pilot signal to a common control signal or an individual control signal, which is transmitted via the transmission antennas.

A wireless transmission device according to a tenth aspect of the present invention includes n (where n is an integer of two or more) transmission antennas and a delay imparting section for delaying transmission signals supplied to the n transmission antennas by a maximum delay time (n−1)T or less, wherein the delay imparting section sets the maximum delay time (n−1)T, being defined as (n−1)T>1/$F_c$ when the transmission antennas transmit multicast signals or broadcast signals.

In the wireless transmission devices according to the first to tenth aspects of the present invention, the n transmission antennas belong to different sectors.

In the wireless transmission devices according to the first to tenth aspects of the present invention, the n transmission antennas belong to different base stations.

A multicarrier wireless transmission device according to an eleventh aspect of the present invention includes n (where n is an integer of two or more) transmission antennas and a delay imparting section for sequentially delaying transmission signals to be supplied to the n transmission antennas, wherein the delay imparting section is capable of varying delay values of the transmission signals so as to produce optimum transmission diversity effects.

A multicarrier wireless transmission device according to a twelfth aspect of the present invention includes n (where n is an integer of two or more) transmission antennas and a delay imparting and directivity control section for supplying transmission signals, which are sequentially delayed or which are subjected to directivity control by way of multiplication using prescribed weights, to the n transmission antennas, wherein the delay imparting and directivity control section performs multiplication on the delay values or the weights with respect to transmission signals, thus producing optimum transmission diversity effects.

A multicarrier wireless transmission device according to a thirteenth aspect of the present invention includes n (where n is an integer of two or more) transmission antennas and a delay imparting section for sequentially delaying transmission signals to be supplied to the n transmission antennas, wherein the delay imparting section applies a delay time applied to a chunk including a common pilot channel, which is transmitted via the transmission antennas, to the common pilot channel.

A multicarrier wireless transmission device according to a fourteenth aspect of the present invention includes n (where n is an integer of two or more) transmission antennas and a delay imparting section for sequentially delaying transmission signals to be supplied to the n transmission antennas, wherein the delay imparting section applies a delay time applied to a chunk including an individual pilot channel, which is transmitted via the transmission antennas, to the individual pilot channel.

A multicarrier wireless transmission device according to a fifteenth aspect of the present invention includes n (where n is an integer of two or more) transmission antennas and a delay imparting and directivity control section for sequentially delaying transmission signals or for performing directivity control by way of multiplication using prescribed weights on transmission signals to be supplied to the n transmission antennas, wherein the delay imparting and directivity control section applies a delay time applied to a chunk including an individual pilot channel, which is transmitted via the transmission antennas, to the individual pilot channel, or it applies an appropriate weight to the individual pilot channel so as to perform directivity control.

A multicarrier wireless transmission device according to a sixteenth aspect of the present invention includes n (where n is an integer of two or more) transmission antennas and a delay imparting section for sequentially delaying transmission signals to be supplied to the n transmission antennas, wherein the delay imparting section applies delay to a synchronization signal, which is transmitted via the transmission antennas.

A multicarrier wireless transmission device according to a seventeenth aspect of the present invention includes n (where n is an integer of two or more) transmission antennas and a delay imparting section for sequentially delaying transmission signals to be supplied to the n transmission antennas, wherein the delay imparting section applies a delay time applied to a common pilot channel, which is transmitted via the transmission antennas, to one of or both of a common control signal and an individual control signal.

A multicarrier wireless transmission device according to an eighteenth aspect of the present invention includes n (where n is an integer of two or more) transmission antennas and a delay imparting section for sequentially delaying transmission signals to be supplied to the n transmission antennas, wherein the delay imparting section applies a delay to a multicast signal or a broadcast signal, which is transmitted via the transmission antennas.

According to a wireless transmission method of the present invention, with reference to a delay time T suited to a communication signal, which indicates whether transmission signals are subjected to frequency diversity transmission or multiuser diversity transmission, the transmission signals supplied to the n (where n is an integer of two or more) transmission antennas are delayed by the maximum delay time (n−1)T or less.

Effect of the Invention

With reference to the delay time T suited to the communication signal, which indicates either the frequency diversity transmission or the multiuser diversity transmission, the transmission signals supplied to the n transmission antennas are each delayed by the delay time (n−1)T or less.

Thus, by appropriately setting the delay time T based on the condition whether the transmission signals are subjected to frequency diversity transmission or multiuser diversity transmission, it is possible to produce frequency diversity effects and multiuser diversity effects without being affected by the condition of a propagation path.

BRIEF DESCRIPTION OF THE DRAWINGS

FIG. 7A is an illustration showing a wireless transmission/reception system, in which the same signal is applied with different delay times and is then transmitted via plural transmission antennas of a wireless transmission device.

FIG. 7B is a graph showing an example of a reception signal in the system shown in FIG. 7A.

FIG. 7C is a graph showing another example of a reception signal in the system shown in FIG. 7A.

FIG. 14 is a table showing the relationship between the maximum delay time (n−1)T between transmission antennas and a frequency bandwidth $F_c$ of a chunk with respect to each physical channel.

FIG. 15 is a table showing another relationship between the maximum delay time (n−1)T between transmission antennas and the frequency bandwidth $F_c$ of a chunk with respect to each physical channel.

Figure 1:
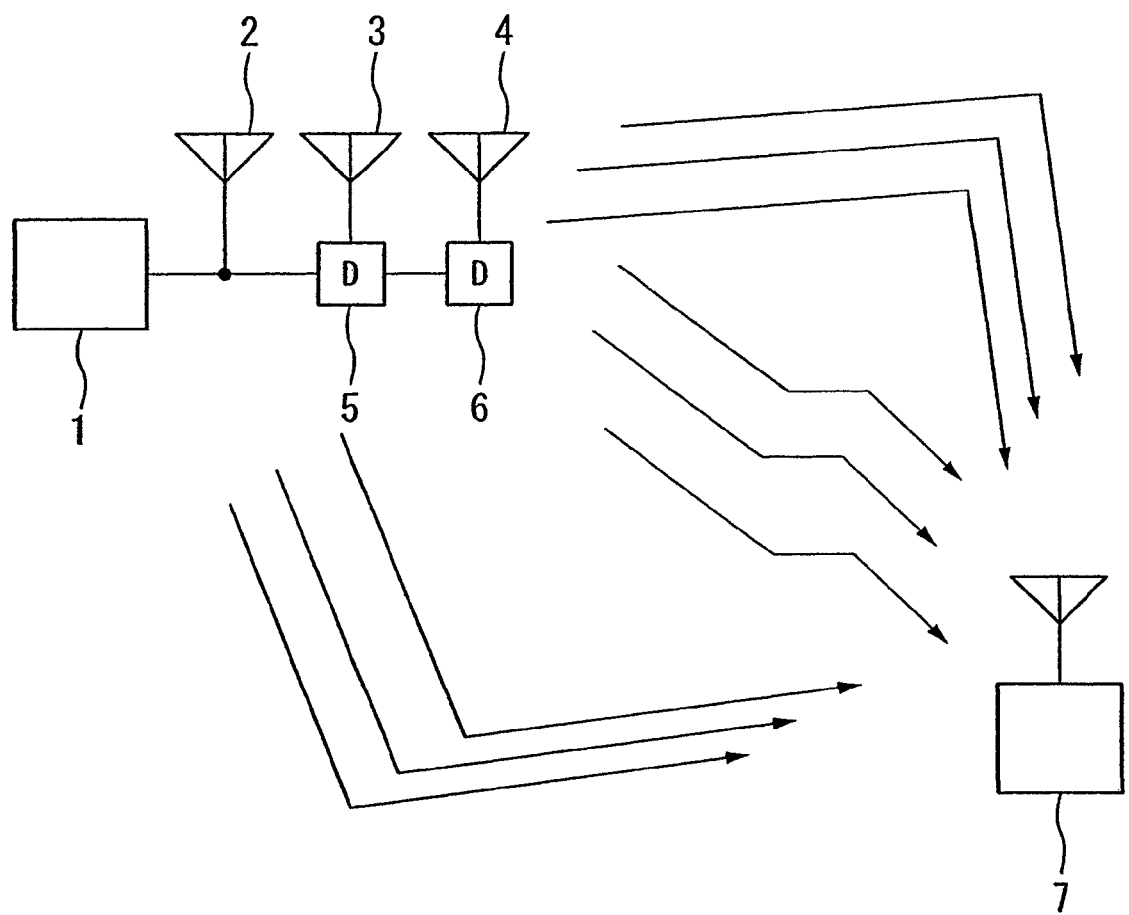
FIG. 1 is a schematic illustration showing that signals transmitted by a wireless transmission device according to a first embodiment of the present invention are propagated through plural propagation paths so as to reach a wireless reception device.

DESCRIPTION OF THE REFERENCE NUMERALS 1 wireless transmission device
2-4 transmission antenna
5, 6 delay
7, 8, 9, 10 wireless reception device
11a, 11b, 111a, 111b, 211a, 211b user-dependent signal processor
12-1, 12-2, 12-3, 112-1 to 112-3, 212-1 to 212-3, 312-1 to 312-3 antenna-dependent signal processor
13 error correcting coding section
14 modulator
15, 215 sub-carrier assignment section
16 IFFT section
17 parallel-series converter
18 GI imparting section
19-1 to 19-3 delay imparting section
119-1 to 119-3 circulating delay imparting section
20 mixer
21 filter
22 D/A converter
110 memory
219 phase rotation section
220 delay imparting section
310 weight calculation section
319 weighted multiplication section
320 delay imparting and directivity control section

BEST MODE FOR CARRYING OUT THE INVENTION

First Embodiment

FIG. 1 is a schematic illustration showing that signals transmitted from a wireless transmission device 1 are propagated through plural propagation paths so as to reach a wireless reception device 7. The wireless transmission device 1 has plural transmission antennas 2 to 4, which are respectively applied with different delay times 0, T, and 2T and from which signals are transmitted. The wireless reception device 7 receives signals transmitted from the wireless transmission device 1. FIG. 1 shows an example in which the wireless transmission device 1 is equipped with three transmission antennas 2 to 4.

Suppose that plural transmission antennas are transmission antennas installed in a wireless transmission device facilitated in a base station for cellular phones, wherein three types of transmission antennas are provided with respect to different sectors of the same base station and with respect to different base stations. The following description is given with respect to the situation in which they belong to the same sector, for example, but it is possible to employ another constitution. That is, n transmission antennas belong to different sectors, or n transmission antennas belong to different base stations.

In the figure, delays 5 and 6 apply a delay time T, by which, as described above, the delay time T is applied to the transmission antenna 3, and the delay time 2T is applied to the transmission antenna 4.

Figure 2A:
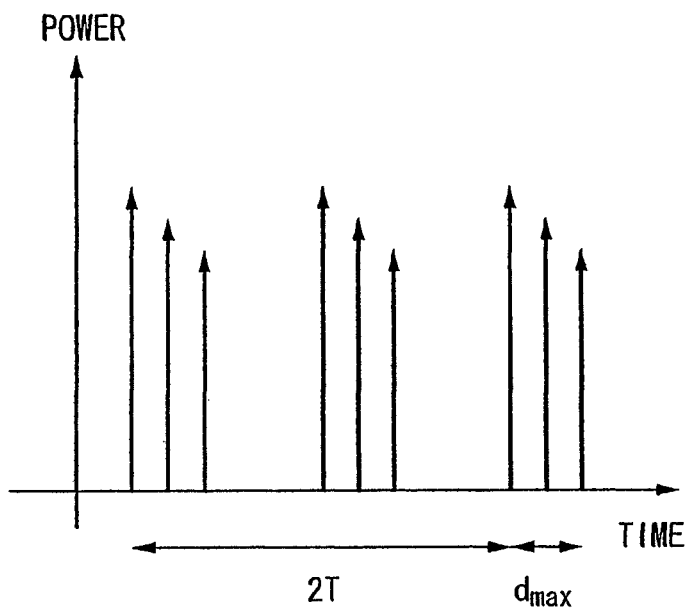
FIG. 2A is a graph showing a delay profile applied to signals that are propagated through plural propagation paths having different delay times so as to reach a wireless reception device.
Figure 2B:
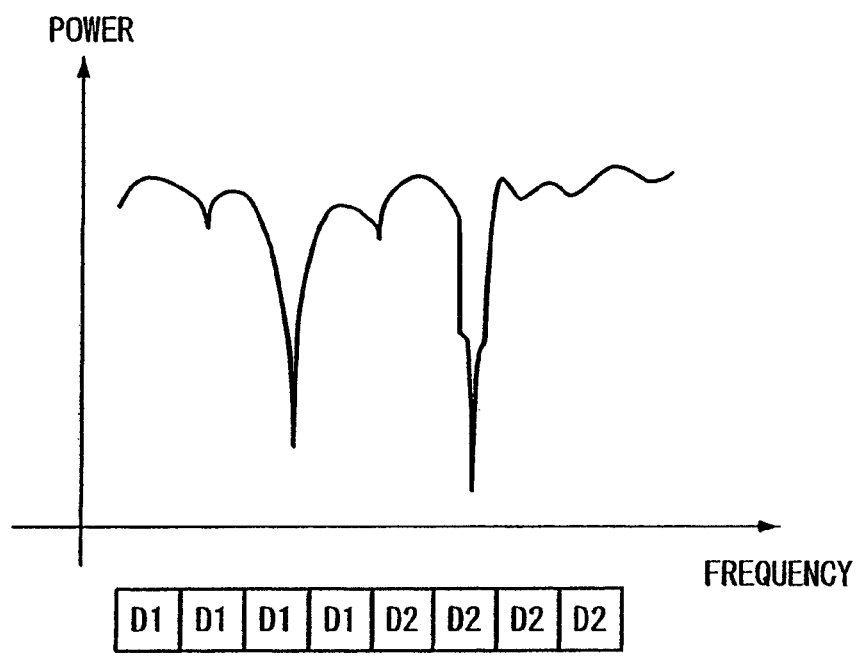
FIG. 2B is a graph showing a transfer function that is produced by performing frequency conversion on the delay profile shown in FIG. 2A.

FIGS. 2A and 2B show a delay profile and a transfer function with respect to signals, which are propagated through plural (three) propagation paths having different delay times so as to reach a wireless reception device. FIG. 2A shows the delay profile showing that transmission signals are propagated through plural propagation paths having different delay times so as to reach the wireless reception device with respect to time (horizontal axis) and power (vertical axis). As shown in FIG. 2A, the delay profile instantaneously has a maximum delay waveform of $2T+d_{max}$; hence, compared with the constitution in which the same signal is transmitted via each transmission antenna, the maximum delay waveform becomes very large. Herein, $d_{max}$ represents an arrival time difference between a fast propagation path and a slow propagation path when radio waves arrive at a reception antenna from a transmission antenna.

Figure 17A:
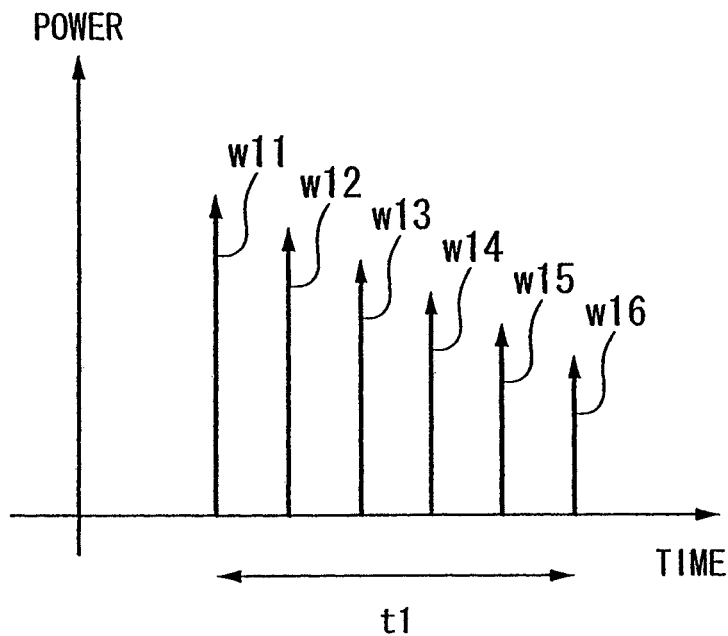
FIG. 17A is a graph showing a delay profile adapted to signals that are propagated through plural propagation paths having different delay times so as to reach a wireless reception device.
Figure 17B:
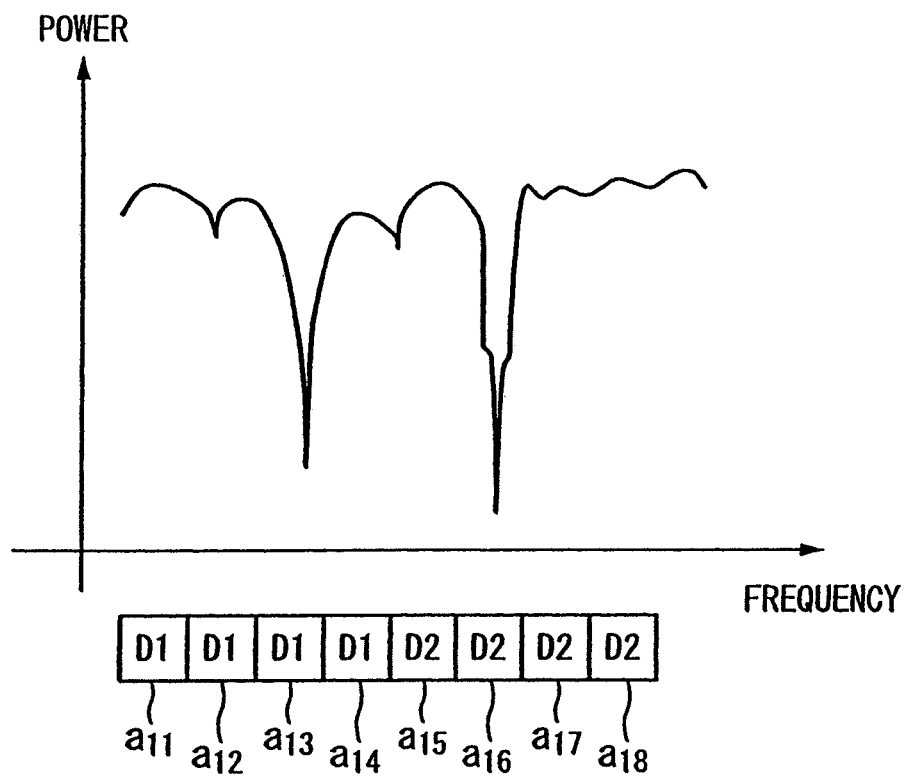
FIG. 17B is a graph showing a transfer function that is produced by performing frequency conversion on the delay profile shown in FIG. 17A.
Figure 18A:
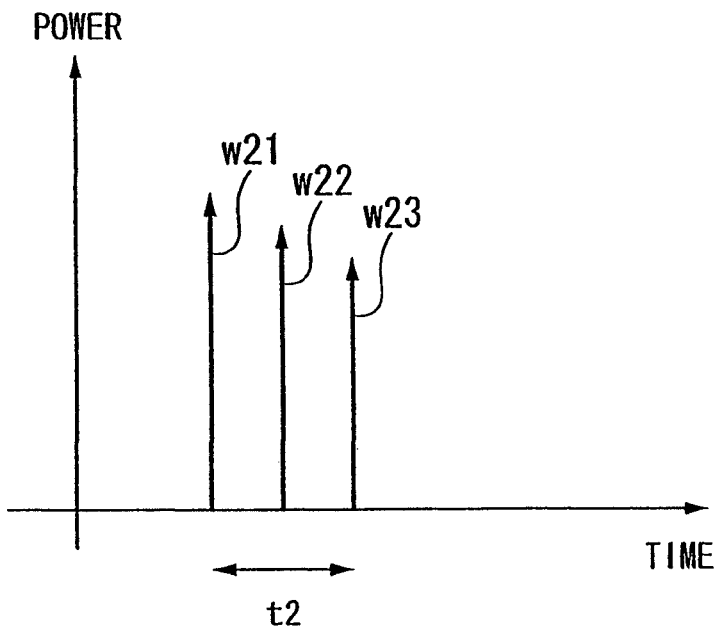
FIG. 18A is a graph showing a delay profile adapted to signals that are propagated through propagation paths having different delay times so as to reach a wireless reception device.
Figure 18B:
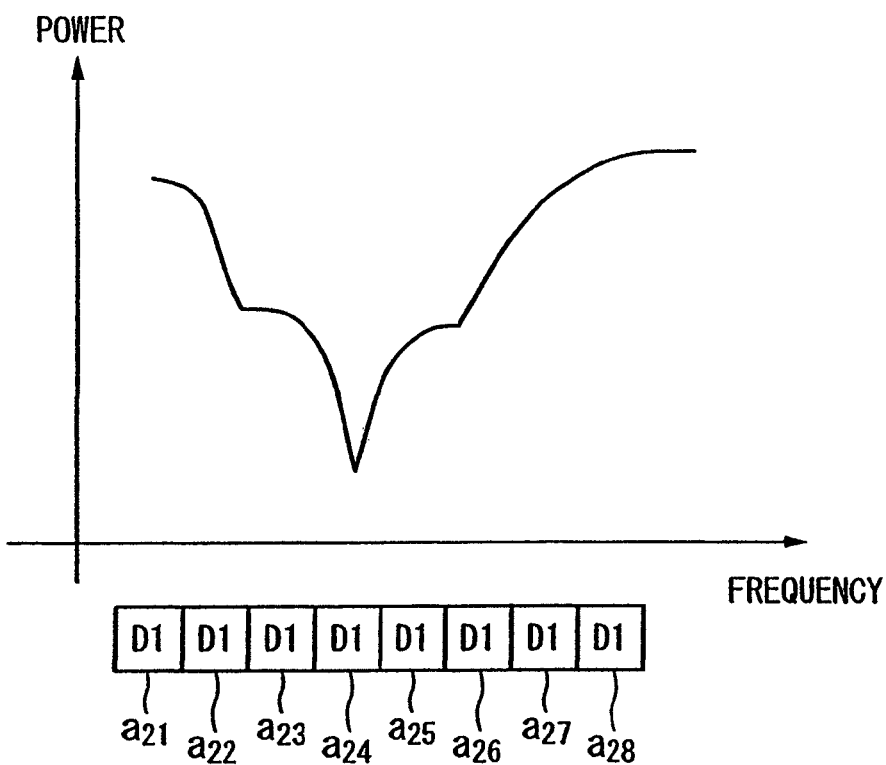
FIG. 18B is a graph showing a transfer function that is produced by performing frequency conversion on the delay profile shown in FIG. 18A.

FIG. 2B shows a transfer function that is produced by performing frequency conversion on the delay profile of FIG. 2A with respect to frequency (horizontal axis) and power (vertical axis). In the delay profile, the increasing maximum delay time $2T+d_{max}$ indicates rapid frequency variations of the transfer function. Therefore, as shown in FIG. 2B (similar to FIG. 17B), data D1 and D2 are spread with a spread ratio "4" and are assigned with sub-carriers. It is preferable that the spread coefficient or the coding coefficient of error correcting coding be controlled in response to frequency variations of the transfer function in the wireless transmission device 1, wherein the aforementioned method states that the delay time 2T is acknowledged in advance by the wireless transmission device 1; hence, it is possible to determine the spread coefficient or the coding coefficient of error correcting coding irrespective of frequency variations of propagation paths.

In order to produce multiuser diversity effects, it is preferable that the maximum delay time $2T+d_{max}$, which appears instantaneously in the delay profile, be not increased so much. Multiuser diversity effects will be described with reference to FIGS. 3A to 3C.

Figure 3A:
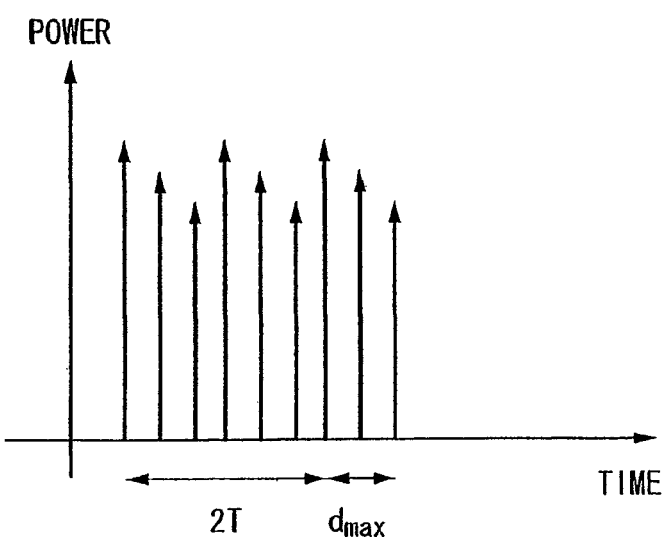
FIG. 3A is a graph showing another delay profile applied to signals that are propagated through plural propagation paths having different delay times so as to reach a wireless reception device.
Figure 3B:
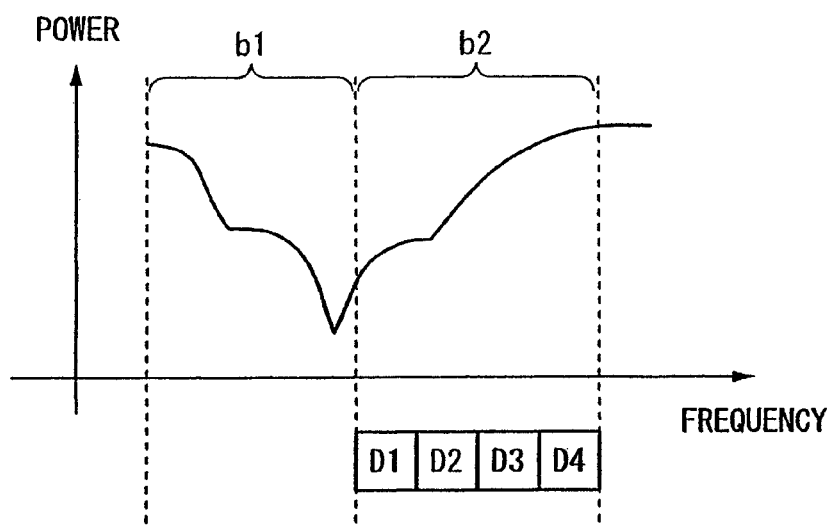
FIG. 3B is a graph showing a transfer function of the wireless reception device, which is produced by performing frequency conversion on the delay profile shown in FIG. 3A.
Figure 3C:
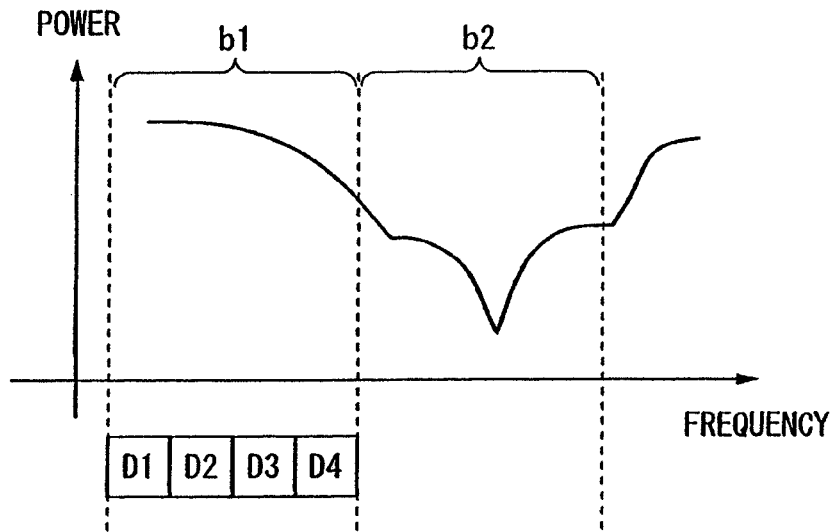
FIG. 3C is a graph showing a transfer function of another wireless reception device located at a different position, which is produced by performing frequency conversion on the delay profile shown in FIG. 3A.

FIGS. 3A to 3C show a delay profile and transfer functions with respect to signals that are propagated through plural propagation paths having different delay times so as to reach a wireless reception device. FIG. 3A shows the delay profile adapted so transmission signals that are propagated through plural (three) propagation paths having different delay times so as to reach the wireless reception device with respect to time (horizontal axis) and power (vertical axis).

FIG. 3B shows a transfer function with regard to a wireless reception device used by a user u1. FIG. 3C shows a transfer function with regard to a wireless reception device used by a user u2. Since the wireless reception devices of the users u1 and u2 differ from each other in location, the instantaneous transfer functions thereof differ from each other.

Suppose that a left region is connected to a frequency channel b1 and a right channel is connected to a frequency channel b2 in FIGS. 3B and 3C, the user u1 enjoys a good quality in the frequency channel b2, while the user u2 enjoys a good quality in the frequency channel b1. Therefore, data D1 to D4 are transmitted to the user u1 over the frequency channel b2. Data D1 to D4 are subjected to spectrum spreading. Data D1 to D4 are transmitted to the user u2 over the frequency channel b1. In this case, data D1 to D4 are subjected to spectrum spreading.

As described above, by use of a quality difference between frequency channels at a certain instant, it is possible to produce multiuser diversity effects for improving transmission efficiency with respect to different users who perform communications using different frequency channels.

However, when the maximum delay time $2T+d_{max}$ is increased so much, rapid frequency variations occur in the transfer function, thus reducing quality difference between the frequency channel b1 and the frequency channel b2.

Therefore, in order to produce adequate multiuser diversity effects, it is important to reduce the maximum delay time $2T+d_{max}$ as shown in FIG. 3A.

Figure 4A:
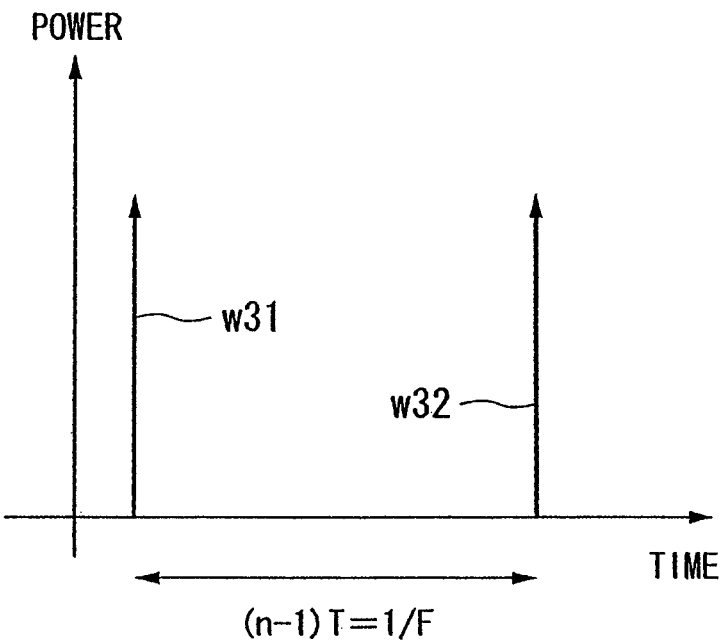
FIG. 4A is a graph showing a maximum delay time (n−1)T in a delay profile.
Figure 4B:
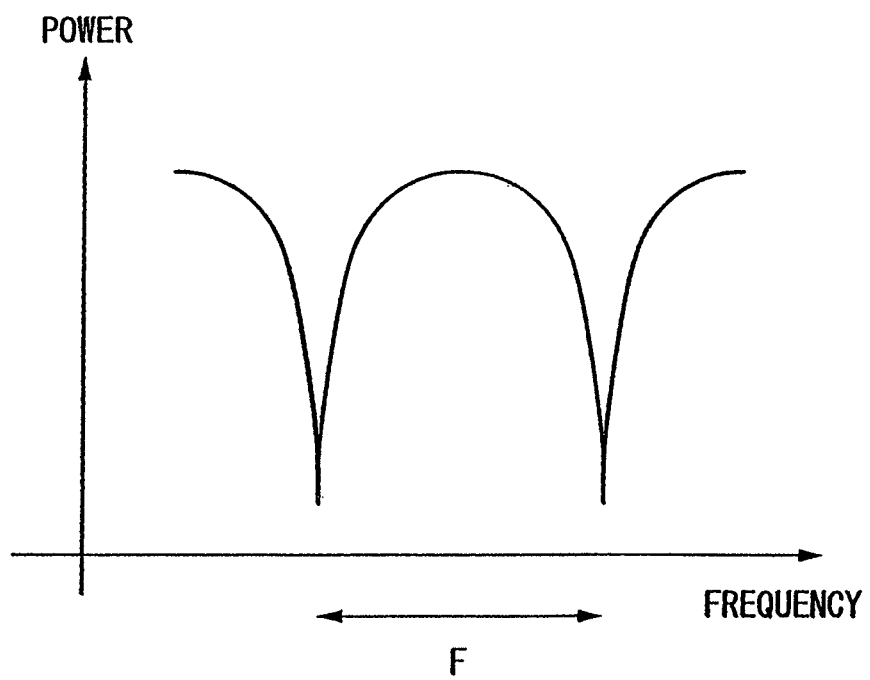
FIG. 4B is a graph showing the relationship between the maximum delay time (n−1)T shown in FIG. 4A and frequency variations.

FIGS. 4A and 4B and FIGS. 5A and 5B show the relationships between the maximum delay time (n−1)T and frequency variations. When an arrival time difference (n−1)T appears between arrival waves w31 and w32 as shown in FIG. 4A, a transfer function of this propagation path is shown in FIG. 4B. That is, a frequency difference between amplitude drops of power (vertical axis) is defined as F=1/(n−1)T.

Figure 5A:
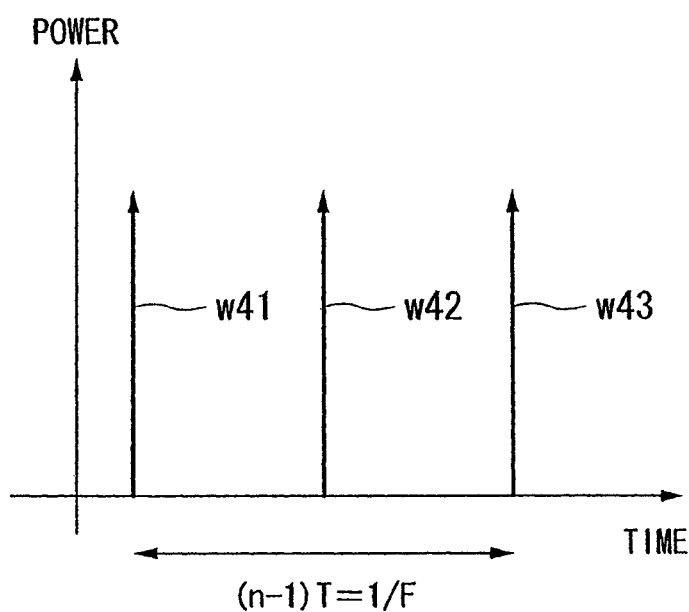
FIG. 5A is a graph showing another maximum delay time (n−1)T in a delay profile.
Figure 5B:
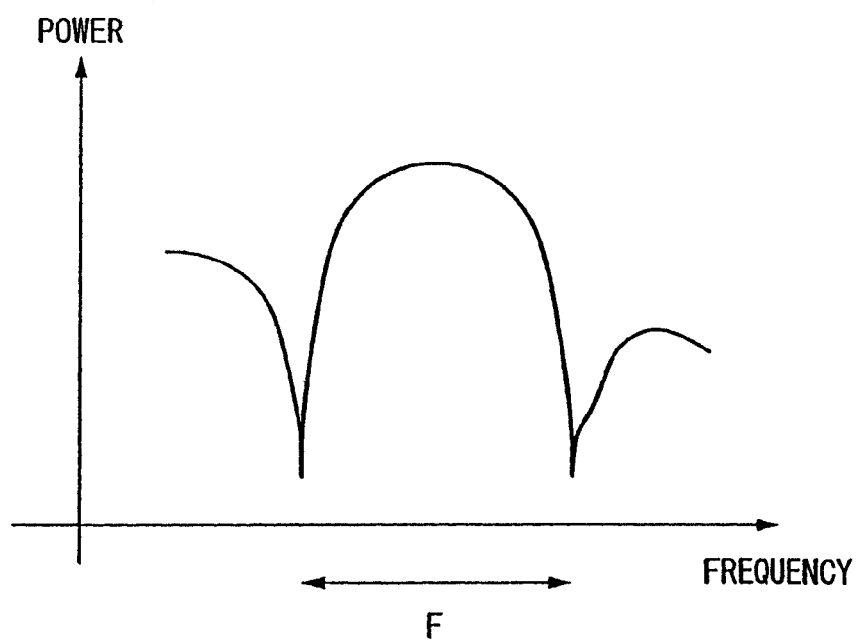
FIG. 5B is a graph showing the relationship between the maximum delay time (n−1)T shown in FIG. 5A and frequency variations.

When plural delay waves w41 to w43 appear as shown in FIG. 5A, an arrival time difference (n−1)T appears between the first arrival wave w41 and the last arrival wave w43, so that a frequency difference between amplitude drops of power (vertical axis) is defined as F=1/(n−1)T as shown in FIG. 5B.

In this connection, the frequency diversity effect differs from the multiuser diversity effect in terms of frequency variations of appropriate transfer functions thereof; hence, in order to produce the frequency diversity effect, the maximum delay time (n−1)T is set as (n−1)T>$F_c$ where $F_c$ denotes a frequency bandwidth of a chunk, which is a basic region secured by the user to perform communication and defined with respect to the frequency axis and time axis, thus creating an environment easily producing the frequency diversity effect.

In contrast, in order to produce the multiuser diversity effect, the maximum delay time (n−1)T is set as (n−1)T<1/$F_c$, where $F_c$ denotes a frequency bandwidth of a chunk, thus creating an environment easily producing the multiuser diversity effect. In the following description, an inequality of (n−1)T<1/$F_c$ encompasses (n−1)T=0. In the following description, delay times applied to transmission antennas are each represented as (n−1) multiples of T where T is assumed to be constant, whereas it is possible to change T with respect to each of transmission antennas. In order to produce the multiuser diversity effect, it is possible to reduce the maximum delay time by reducing the number of transmission antennas used for transmission instead of setting the inequality of (n−1)T<1/$F_c$.

As described above, in response to a determination as to whether transmission signals are subjected to the frequency diversity transmission or the multiuser diversity transmission (i.e., (n−1)T>1/$F_c$ or (1−n)T<1/$F_c$), it is possible to produce the frequency diversity effect or the multiuser diversity effect without being affected by conditions of propagation paths.

Figure 16A:
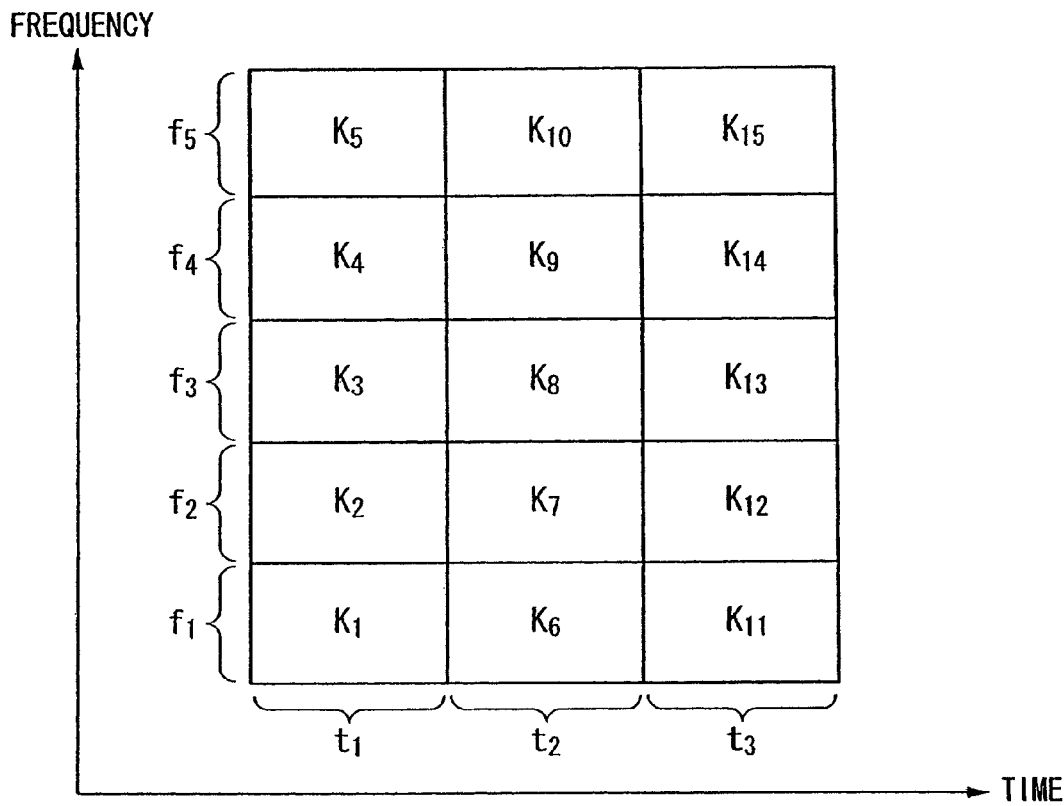
FIG. 16A is a graph showing the relationship between signals, which are transmitted from a wireless transmission device to a wireless reception device, with respect to time (horizontal axis) and frequency (vertical axis).
Figure 16B:
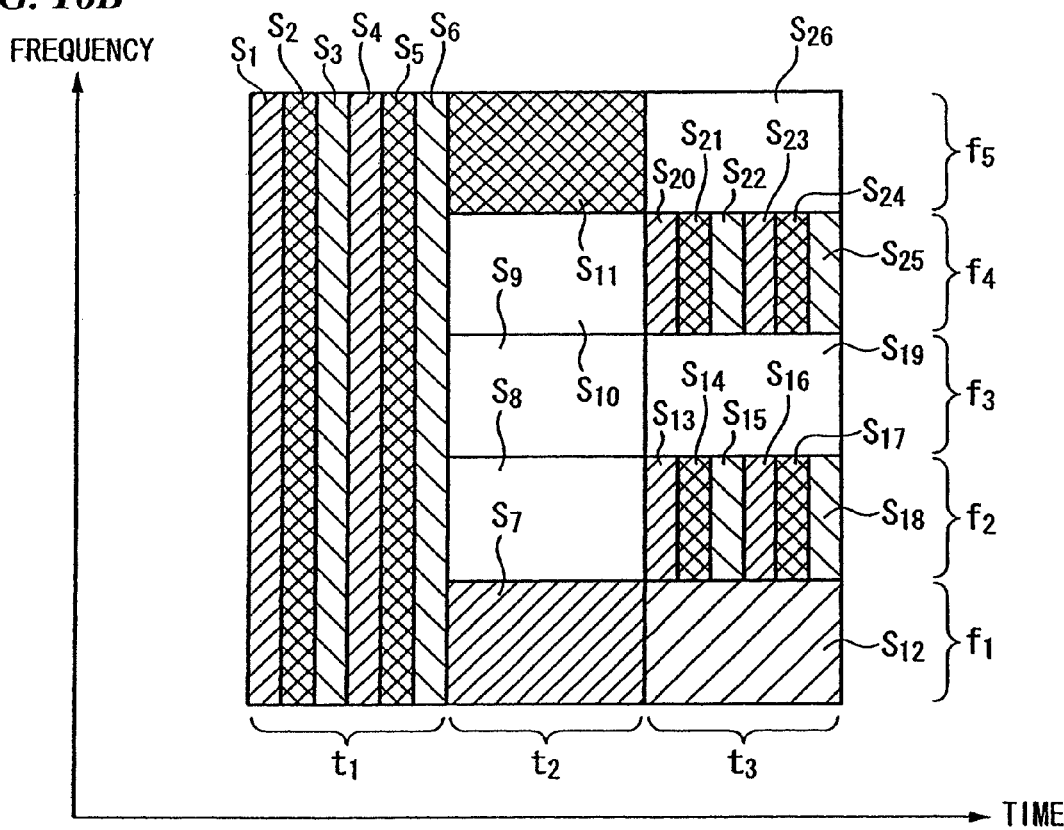
FIG. 16B is a graph showing communication slots that are assigned to a time-frequency space shown in FIG. 16A.

As shown in FIG. 16A, with respect to the first user who performs communication by way of the communication slot $s_1$ that is produced by connecting plural consecutive chunks in the frequency direction and the user who is assigned with discontinuous chunks such as the ninth user who is assigned with the communication slots $s_{13}$, $s_{16}$, $s_{20}$, and $s_{23}$, the bandwidth BW (i.e., BW=5F for the first user, and BW=3F for the ninth user) of a communication slot instantaneously assigned to the user defines the basis for the realization of the frequency diversity effect; hence, by setting the maximum delay time as (n−1)T>1/BW, it is possible to produce the frequency diversity effect.

For example, the delay time T is set such that the maximum delay time (n−1)T between transmission antennas falls within a range of (n−1)T>1/BW when a communication signal indicates the frequency diversity effect, while the delay time T is set such that the maximum delay time (n−1)T between transmission antennas falls within a range of (n−1)T<1/$F_c$.

Although no illustration is provided, when a sub-carrier partially included in plural chunks is assigned to a certain user, the bandwidth BW of a communication slot assigned to the user represents a frequency difference between the sub-carriers, which deviate from each other at most within the sub-carriers instantaneously assigned to the user.

The determination as to whether signals are subjected to the frequency diversity transmission or the multiuser diversity transmission can be changed over based on types of transmission signals (e.g., pilot signals, control signals, broadcast/multicast signals, and the like), moving speeds of wireless reception devices (where the frequency diversity is selected in case of a high moving speed, and the multiuser diversity is selected in case of a low moving speed), and the like.

Figure 6B:
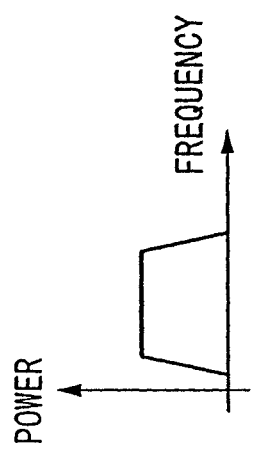
FIG. 6B is a graph showing an example of a reception signal in the system shown in FIG. 6A.
Figure 6C:
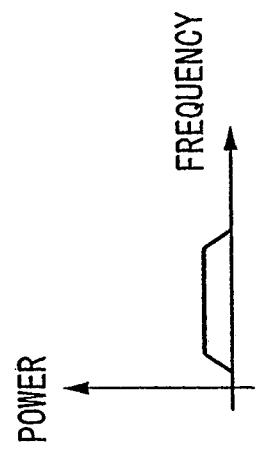
FIG. 6C is a graph showing another example of a reception signal in the system shown in FIG. 6A.
Figure 6A:
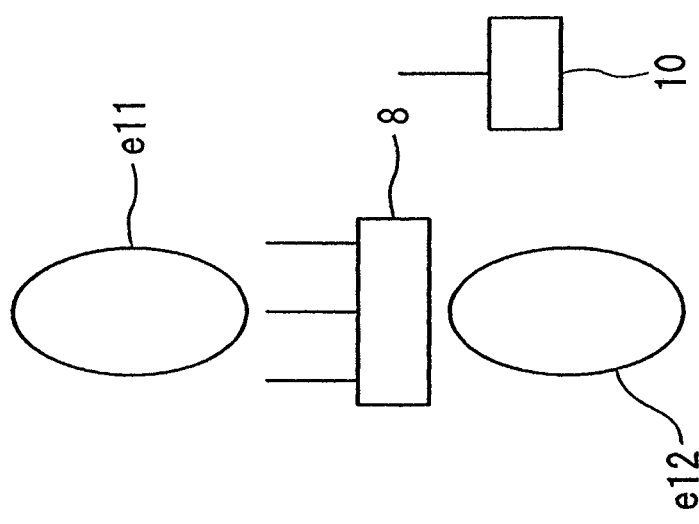
FIG. 6A is an illustration showing a wireless transmission/reception system, in which the same signal not having a delay time is transmitted via plural antennas of a wireless transmission device.

FIGS. 6A to 6C are explanatory drawings for the situation in which the same signal having no delay time is transmitted via plural antennas of a wireless transmission device 8. Suppose that, as shown in FIG. 6A, the wireless transmission device 8 is equipped with plural (three) transmission antennas, which are arranged in parallel and which have no directivity in the horizontal direction. Due to the occurrence of lobes e11 and e12 indicated by ellipses shown in FIG. 6A, there is a direction arranging a wireless reception device 9 that receives reception signals with a high reception level with respect to all frequency bands (see FIG. 6B) and a direction arranging a wireless reception device 10 that receives reception signals with a low reception level with respect to all frequency bands (see FIG. 6C).

FIGS. 7A to 7C are explanatory drawings in which the same signal is applied with different delay times respectively and is then transmitted via plural transmission antennas of the wireless transmission device 8. Suppose that the wireless transmission device 8 is equipped with plural (three) transmission antennas having no directivity, which are arranged in parallel. Due to the occurrence of lobes e21 to e26 in narrow bands, there occur a frequency band securing a high reception level and a frequency band securing a low reception level within reception signals, whereas an average reception level is maintained substantially constant irrespective of directions; hence, it is possible to secure substantially the same quality with respect to both of the reception level of a wireless reception device 9 (see FIG. 7B) and the reception level of a wireless reception device 10 (see FIG. 7C). Therefore, the method, in which signals are applied with different delay times and are then transmitted via transmission antennas of the wireless transmission device 8, compensates for drawbacks of the method, which is described with reference to FIGS. 6A to 6C and in which the same signal is transmitted via plural transmission antennas.

Second Embodiment

A second embodiment of the present invention will be described with respect to the constitution of a wireless transmission device. Similar to the wireless transmission device 1 of the first embodiment (see FIG. 1), the wireless transmission device of the present embodiment has plural transmission antennas.

The wireless transmission device described below is a wireless transmission device in which different delay times are applied to transmission antennas for transmitting signals, wherein delay times are imparted in a time region.

Signals applied with different delay times in connection with transmission antennas are described in the present embodiment in such a way that a signal, which is delayed by T with respect to a transmission signal actually transmitted from a first transmission antenna, is transmitted via a second transmission antenna, and similarly, a n-th transmission antenna transmits a signal delayed by (n−1)T.

Figure 8:
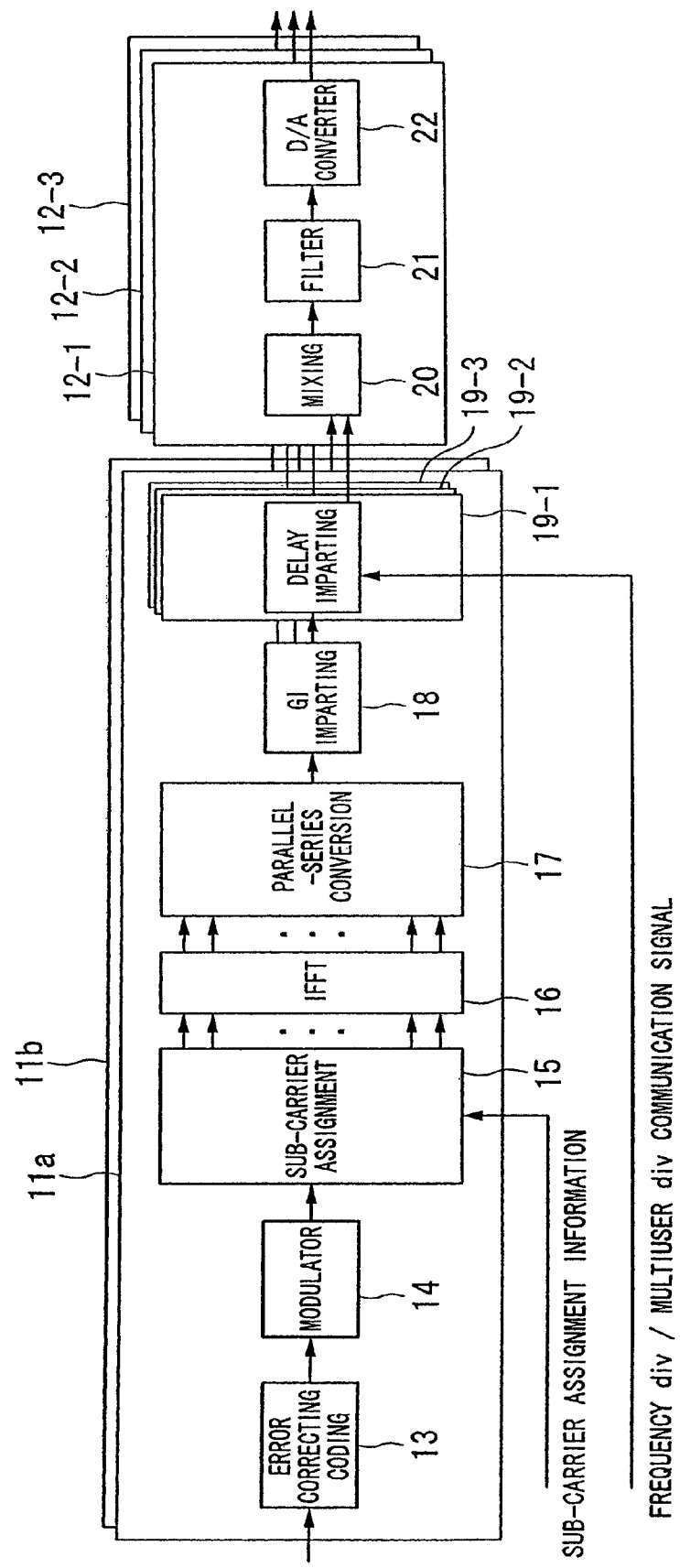
FIG. 8 is a block diagram showing the configuration of a physical layer of a wireless transmission device according to a second embodiment of the present invention.

FIG. 8 is a block diagram showing the configuration of a physical layer of the wireless transmission device of the present embodiment. The physical layer represents a portion of the configuration of the wireless transmission device, in particular, which receives transmission signals, which performs signal processing into a wireless-transmittable form, and which forwards signals to a wireless frequency converter for performing frequency conversion into wireless frequencies.

As shown in FIG. 8, the physical layer includes user-dependent signal processors 11a and 11b and antenna-dependent signal processors 12-1, 12-2, and 12-3. The user-dependent signal processor 11a (similar to the user-dependent signal processor 11b) performs signal processing on signals to be transmitted to a wireless reception device used by each user. The antenna-dependent signal processor 12-1 (similar to the antenna-dependent signal processors 12-2 and 12-3) performs signal processing with respect to each of transmission antennas.

The user-dependent signal processor 11a includes an error correcting coding section 13, a modulator 14, a sub-carrier assignment section 15, an IFFT (Inverse Fast Fourier Transform) section 16, a parallel-series conversion section 17, a GI (Guard Interval) imparting section 18, and delay imparting sections 19-1, 19-2, and 19-3.

The error correcting coding section 13 performs error correcting coding on transmission signals. The modulator 14 performs modulation processing such as QPSK (Quadrature Phase Shift Keying) and 16QAM (Quadrature Amplitude Modulation) on the output of the error correcting coding section 13.

The sub-carrier assignment section 15 assigns the output of the modulator 14 to appropriate sub-carriers based on sub-carrier assignment information indicated by a high-order layer. The IFFT section 16 performs frequency-time conversion on the output of the sub-carrier assignment section 15.

The parallel-series conversion section 17 performs parallel-series conversion on the output of the IFFT section 16. The GI imparting section 18 imparts guard intervals to the output of the parallel-series conversion section 17. The delay imparting section 19-1 imparts different delays to the output of the GI imparting section 18 in connection with transmission antennas.

The outputs of the delay imparting sections 19-1 to 19-3 are supplied to the antenna-dependent signal processors 12-1, 12-2, and 12-3 respectively. The delay imparting sections 19-1 to 19-3 provide different delays (e.g., 0, S, and 2S). Herein, S=T/(sample time). The sample time represents a minimum time interval between digital signals, which are processed in the GI imparting section 18, the delay imparting sections 19-1 to 19-3, and the mixing section 20.

Therefore, imparting a delay of S samples in the delay imparting sections 19-1 to 19-3 indicates that a delay of time T is imparted at the output terminal of the D/A converter 22. The user-dependent signal processor 11a is used in a certain chunk; in other words, it is used in either a frequency diversity region or a multiuser diversity region; hence, it receives a communication signal (frequency div/multiuser div communication signal) directing the use of either the frequency diversity region or the multiuser diversity region from the high-order layer controlling the physical layer. The user-dependent signal processor 11a selectively uses either the frequency diversity region or the multiuser diversity region based on the communication signal, thus functioning to change the delay time T.

The user-dependent signal processor 11b has a constitution similar to that of the user-dependent signal processor 11a, but differs from it in terms of the user thereof.

The antenna-dependent signal processor 12-1 includes the mixing section 20, a filter 21, and a D/A (Digital/Analog) converter 22.

The mixing section 20 adds together and mixes signals, which are output to the antenna-dependent signal processor 12-1 from the user-dependent signal processors 11a and 11b. The filter 21 extracts signals of a prescribed band only from the output of the mixing section 20. The D/A converter 22 performs digital-to-analog conversion on the output of the filter 21.

Both the antenna-dependent signal processors 12-2 and 12-3 have the constitution similar to that of the antenna-dependent signal processor 12-1. The output of the antenna-dependent signal processor 12-1 is forwarded to a wireless frequency converter (not shown) for performing frequency conversion into wireless frequencies, from which it is supplied to plural (three) transmission antennas, thus transmitting wireless signals.

Third Embodiment

A third embodiment of the present invention will be described with respect to another constitution of a wireless transmission device. The wireless transmission device of the present embodiment is a wireless transmission device that applies different delay times to transmission antennas so as to transmit signals, wherein delay times are applied with respect to a time region.

The wireless transmission device handles signals, which are applied with guard intervals with respect to symbols (valid symbol intervals) of transmission signals. Signals applied with different delay times with respect to transmission antennas are focused on prescribed portions (valid symbol intervals) of transmission signals, which are actually transmitted via a first transmission antenna except for guard intervals; hence, only the valid symbol intervals are delayed by T and are then transmitted via a second transmission antenna; similarly, only the valid symbol intervals are delayed by (n−1)T and are then transmitted via a n-th transmission antenna.

Therefore, transmission antennas transmit signals, which are applied with guard intervals in correspondence with valid symbol intervals; hence, unlike the second embodiment, no time deviation occurs at the symbol timing at the transmission antennas. A delay time imparting method described above is referred to as "circulating delay imparting" in the following description. By way of the processing for imparting circulating delay, securing delay waves is advantageous in comparison with the second embodiment which describes that delay times are applied to transmission antennas.

Figure 9A:
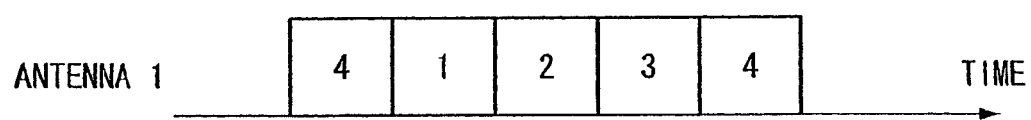
FIG. 9A shows an example of a signal that is produced by applying a circulating delay to a transmission signal in accordance with a third embodiment of the present invention.
Figure 9B:
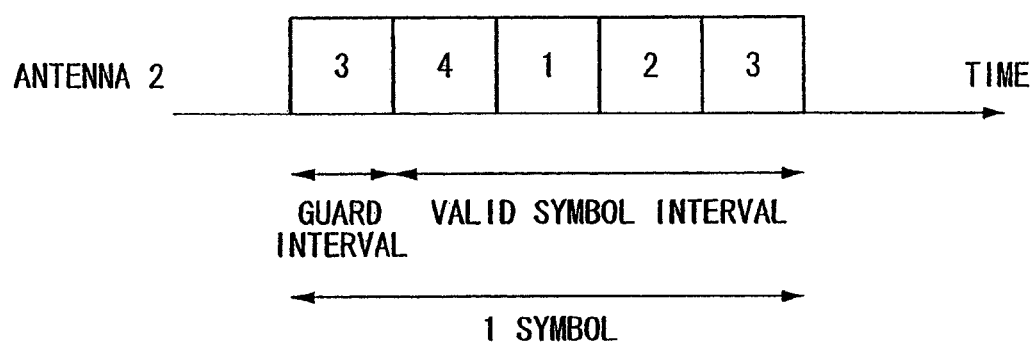
FIG. 9B shows another example of a signal that is produced by applying a circulating delay to a transmission signal in accordance with the third embodiment of the present invention.

FIGS. 9A and 9B show examples of signals that are produced by imparting circulating delays to transmission signals in the present embodiment. FIG. 9A shows a signal transmitted via a first antenna, and FIG. 9B shows a signal transmitted via a second antenna. FIGS. 9A and 9B show that the valid symbol interval corresponds to four samples and the guard interval corresponds to one sample, wherein with regard to the valid symbol interval, one sample is delayed in the second antenna compared with the first antenna. No symbol timing deviation occurs in units of symbols with respect to the first antenna and the second antenna; hence, even when a circulating delay is applied thereto, it is acknowledged that a guard interval effect for intensifying against interferences with adjacent symbols is maintained.

Figure 10:
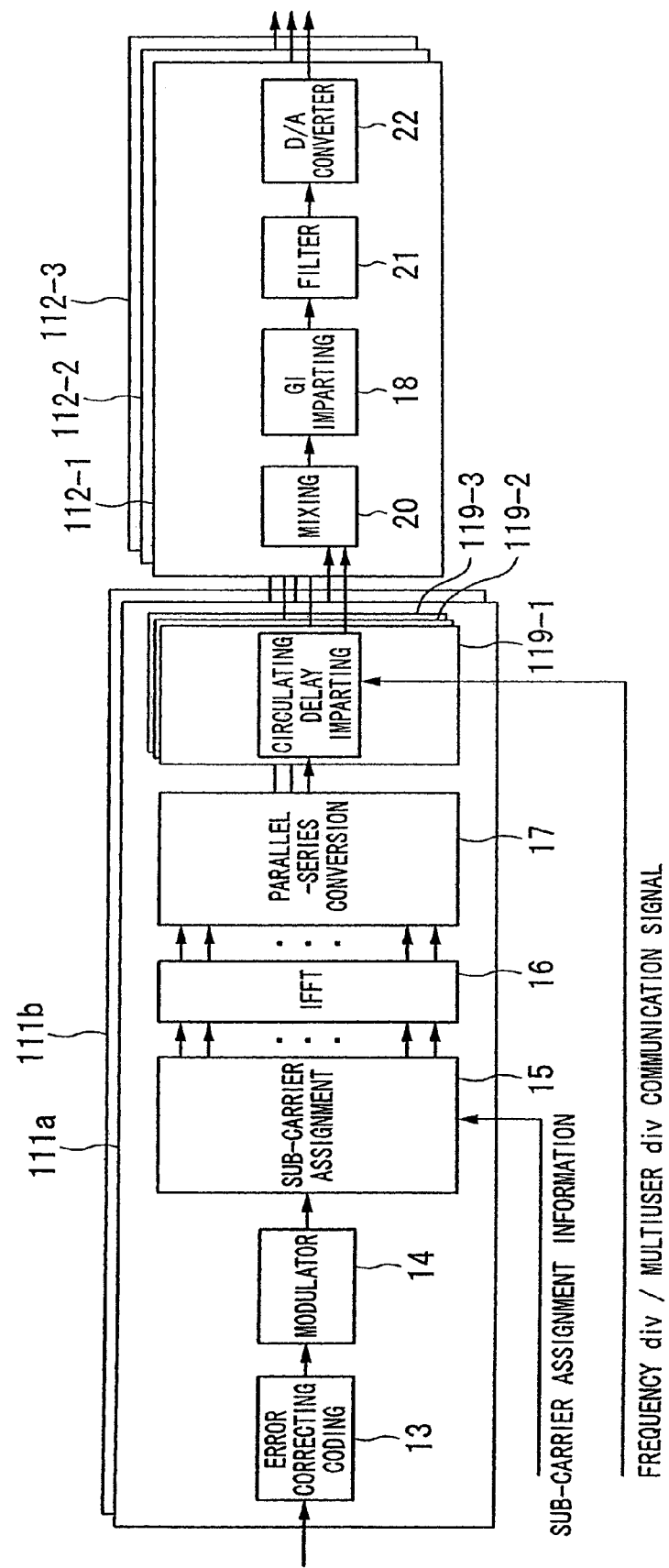
FIG. 10 is a block diagram showing the configuration of a physical layer of a wireless transmission device according to the third embodiment of the present invention.

FIG. 10 is a block diagram showing the configuration of the physical layer of the wireless transmission device according to the present embodiment. As shown in the figure, the physical layer includes user-dependent signal processors 111a and 111b and antenna-dependent signal processors 112-1, 112-2, and 112-3.

The user-dependent signal processor 111a (similar to the user-dependent signal processor 111b) performs signal processing in connection with a wireless transmission device used by each user. The antenna-dependent signal processor 112-1 (similar to the antenna-dependent signal processors 112-2 and 112-3) performs signal processing with regard to a prescribed transmission antenna.

The constitution of the user-dependent signal processor 111a is substantially identical to the constitution of the user-dependent signal processor 11a (FIG. 8) described in the second embodiment, whereas a difference therebetween lies in that the GI imparting section 18 is not provided, and circulating delay imparting sections 119-1 to 119-3 are provided instead of the delay imparting section 19-1 to 19-3.

The user-dependent signal processor 111a shares the same functions as the error correcting coding section 13, the modulator 14, the sub-carrier assignment section 15, the IFFT section 16, and the parallel-series conversion section 17 incorporated in the second embodiment (see FIG. 8); hence, they are designated by the same reference numerals, and the description thereof will be omitted.

The circulating delay imparting section 119-1 imparts different circulating delays to the output of the parallel-series conversion section 17 in connection with transmission antennas. The outputs of the circulating delay imparting sections 119-1 to 119-3 are supplied to the antenna-dependent signal processors 112-1, 112-2, and 112-3. In addition, the circulating delay imparting sections 119-1 to 119-3 provide different delays (e.g., 0, S, and 2S). Herein, S=T/(sample time).

The user-dependent signal processor 111a is used in a certain chunk. Since it is used in either the frequency diversity region or the multiuser diversity region, it receives a communication signal directing the use of either the frequency diversity region or the multiuser diversity region by means of the high-order controlling the physical layer. The user-dependent signal processor 111a selectively uses either the frequency diversity region or the multiuser diversity region based on the communication signal, thus functioning to change the delay time T.

The user-dependent signal processor 111b has a similar constitution as the user-dependent signal processor 111a, but differs from it in terms of the user.

Figure 11:
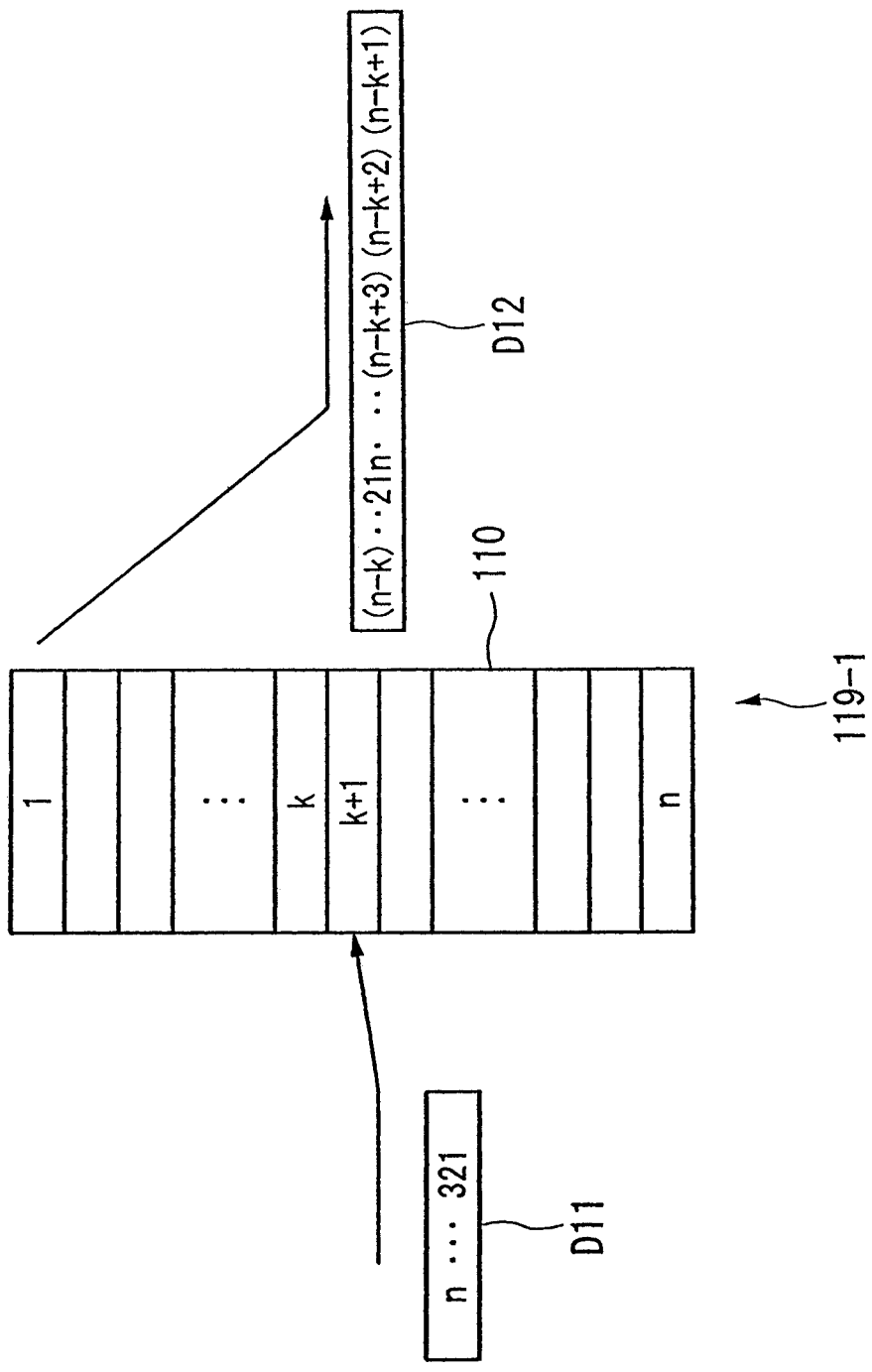
FIG. 11 is an illustration for explaining operation of a circulating delay imparting section 119-1 in the third embodiment of the present invention.

FIG. 11 is an illustration for explaining the circulating delay imparting section 119-1, which is described as an example of the present embodiment. The circulating delay imparting section 119-1 is equipped with a memory 110. In order to impart a circulating delay of k samples, data D11 is sequentially input into address k+1 to address n of the memory 110 (i.e., 1, 2, 3, . . . , (n–k) are input); then, a subsequence of the data D11 is input at address 1 (i.e., (n–k+1), (n–k+2), (n–k+3), . . . , n) are input), thus inputting n samples of the data D11. Next, by sequentially outputting from address 1 of the memory 110, it is possible to output data D12, which is produced by imparting a circulating delay of k samples to the n samples of the data D11, (i.e., (n–k+1), (n–k+2), (n–k+3), . . . , n, 1, 2, . . . , (n–k)).

FIG. 9A shows an example of the signal, which is produced by imparting a circulating delay of zero sample to data of four samples, and FIG. 9B shows an example of the signal, which is produced by imparting a circulating delay of one sample.

The constitution of the antenna-dependent signal processor 112-1 (FIG. 10) is substantially identical to the constitution of the antenna-dependent signal processor 12-1 (FIG. 8) described in the second embodiment, wherein a difference therebetween lies in that the GI imparting section 18 is provided therefor.

Functions of the mixing section 20, the GI imparting section 18, the filter 21, and the D/A converter 22 included in the antenna-dependent signal processor 112-1 are identical to those incorporated in the second embodiment (FIG. 8); hence, they are designated by the same reference numerals, and the description thereof will be omitted.

Both the antenna-dependent signal processor 112-2 and 112-3 have a constitution similar to that of the antenna-dependent signal processor 112-1. The outputs of the antenna-dependent signal processors 112-1, 112-2, and 112-3 are supplied to a wireless frequency converter (not shown) for performing frequency conversion into wireless frequencies, from which they are supplied to plural (three) transmission antennas, thus transmitting wireless signals.

Fourth Embodiment

A fourth embodiment of the present invention will be described with reference to the constitution of another wireless transmission device. The wireless transmission device of the present embodiment is a wireless transmission device in which different delay times are applied to transmission antennas so as to transmit signals, wherein delay times are applied with respect to a frequency region.

The present embodiment deals with signals that are applied with guard intervals with respect to symbols (valid symbol intervals) of transmission signals, wherein similar to the wireless transmission device of the third embodiment (FIG. 10), circulating delays are imparted thereto.

Figure 12:
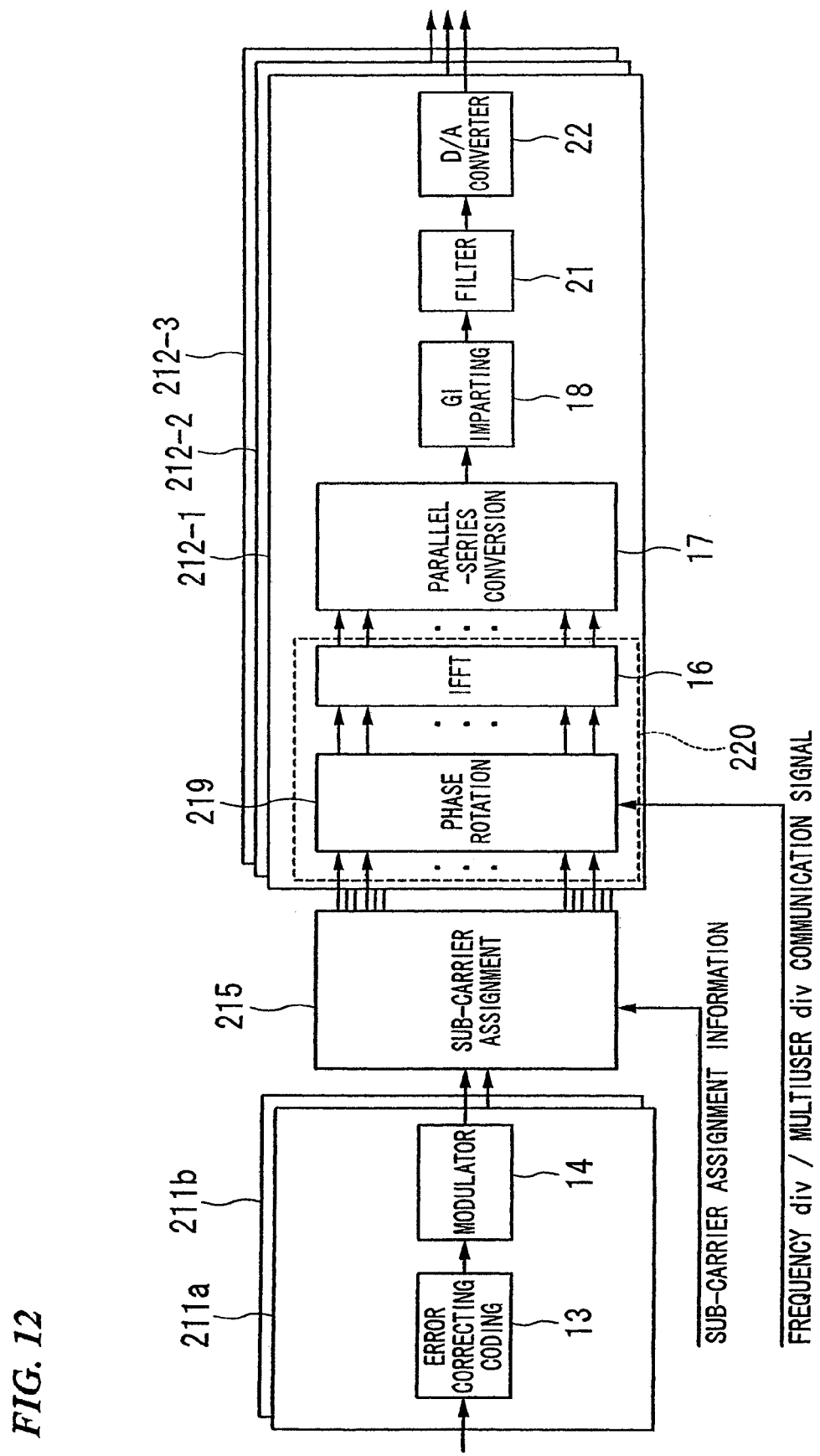
FIG. 12 is a block diagram showing the configuration of a physical layer of a wireless transmission device according to a fourth embodiment of the present invention.

FIG. 12 is a block diagram showing the configuration of the physical layer of the wireless transmission device of the present embodiment. As shown in the figure, the physical layer includes user-dependent signal processors 211a and 211b, a sub-carrier assignment section 215, and antenna-dependent signal processors 212-1, 212-2, and 212-3.

The user-dependent signal processor 211a (similar to the user-dependent signal processor 211b) performs signal processing with respect to a wireless transmission device used by each user. The sub-carrier assignment section 215 assigns the output of the user-dependent signal processor 211a to each sub-carrier. The antenna-dependent signal processor 212-1 (similar to the antenna-dependent signal processors 212-2 and 212-3) performs signal processing with respect to a prescribed antenna.

Each of the user-dependent signal processors 211a and 211b includes an error correcting coding section 13 and a modulator 14. Functions of the error correcting coding section 13 and the modulator 14 are substantially identical to those described in the second embodiment (FIG. 8); hence, they are designated by the same reference numerals, and the description thereof will be omitted.

The outputs of the user-dependent signal processors 211a and 211b are assigned with appropriate sub-carriers in the sub-carrier assignment section 215 based on sub-carrier assignment information indicated by the high-order layer; then, they are supplied to the antenna-dependent signal processors 212-1, 212-2, and 212-3.

The antenna-dependent signal processor 212-1 includes a phase rotation section 219, an IFFT section 16, a parallel-series conversion section 17, a GI imparting section 18, a filter 21, and a D/A converter 22. The functions of the IFFT section 16, the parallel-series conversion section 17, the GI imparting section 18, the filter 21, and the D/A converter 22 are identical to those of the second embodiment (FIG. 8); hence, they are designated by the same reference numerals, and the description thereof will be omitted.

The phase rotation section 219 rotates the output of the sub-carrier assignment section 215 in phase by $\theta_m$ with respect to each sub-carrier and then outputs it to the IFFT section 16. Both the antenna-dependent signal processors 212-2 and 212-3 have a constitution similar to the constitution of the antenna-dependent signal processor 212-1.

The outputs of the antenna-dependent signal processors 212-1, 212-2, and 212-3 are supplied to a wireless frequency converter (not shown) for performing frequency conversion into wireless frequencies, from which they are supplied to plural transmission antennas, thus outputting wireless signals.

In the present embodiment, the rotation of the phase $\theta_m$ in the phase rotation section 219 is set to $\theta_m = 2\pi f_m \cdot (n-1)T$. Herein, $f_m$ denotes a frequency difference between 0-th sub-carrier and m-th sub-carrier, wherein it is defined as $f_m = m/Ts$, so that $(n-1)T$ represents a circulating delay time at n-th antenna in connection with a first antenna. Ts represents a valid symbol time for an OFDM symbol.

A delay imparting section 220 is constituted by the phase rotation section 219 and the IFFT section 16. The phase rotation applied by the phase rotation section 219 is subjected to frequency-time conversion in the IFFT section 16, so that it is regarded as a time delay at the output of the IFFT section 16.

The user-dependent signal processor 211a is used in a certain chunk, which is used in either the frequency diversity region or the multiuser diversity region, wherein it receives a communication signal indicating whether to use the frequency diversity region or the multiuser diversity region from the high-order layer controlling the physical layer. Based on the communication signal, the user-dependent signal processor 211a selectively uses the frequency diversity region or the multiuser diversity region, thus functioning to change the delay time T.

The wireless transmission devices according to the second to fourth embodiments are each equipped with a delay imparting section for delaying transmission signals supplied to n (n is an integer of two or more) transmission antennas by the maximum delay time $(n-1)T$ in accordance with the delay time T suited to a communication signal indicating whether transmission signals are subjected to the frequency diversity transmission or the multiuser diversity transmission.

Thus, by appropriately setting the delay time T based on the determination as to whether transmission signals are subjected to the frequency diversity transmission or the multiuser diversity transmission, it is possible to produce the frequency diversity effect and the multiuser diversity effect without being affected by conditions of propagation paths.

Fifth Embodiment

A fifth embodiment of the present invention will be described with respect to the constitution of another wireless transmission device. The wireless transmission device of the present embodiment is a wireless transmission device that applies different delay times to signals, which are then transmitted via transmission antennas, in the frequency diversity region while applying appropriate weights to transmission antennas so as to perform directivity control in the multiuser diversity region, wherein delay times are applied and directivity control is performed in the frequency region.

The present embodiment deals with signals that are produced by imparting guard intervals to transmission signals with respect to symbols (valid symbol intervals), wherein, similar to the third and fourth embodiments, it imparts circulating delays to signals.

Figure 13:
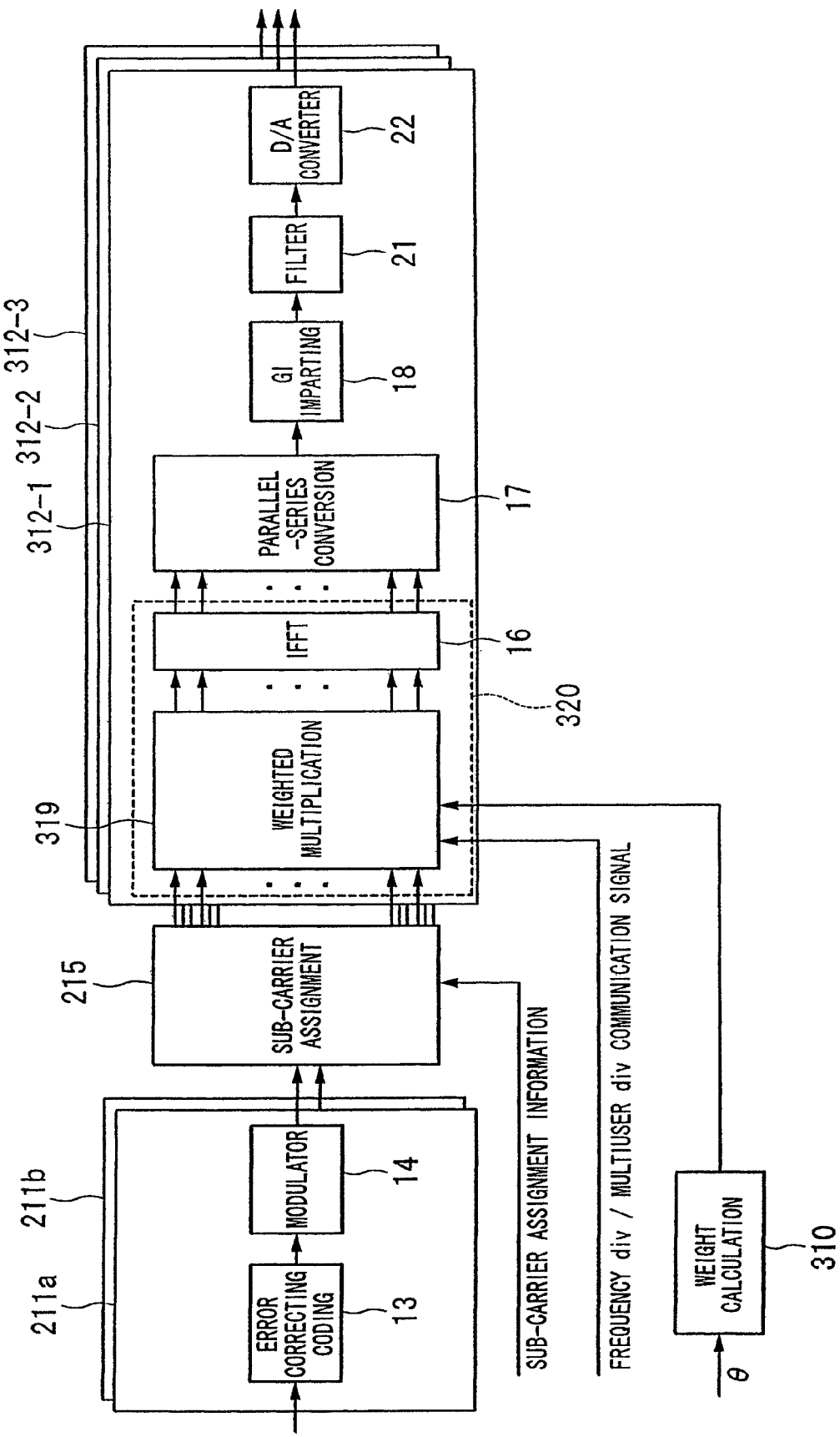
FIG. 13 is a block diagram showing the configuration of a physical layer of a wireless transmission device according to a fifth embodiment of the present invention.

FIG. 13 is a block diagram showing the configuration of a physical layer of the wireless transmission device of the present embodiment. As shown in the figure, the physical layer includes user-dependent signal processors 211a and 211b, a sub-carrier assignment section 215, a weight calculation section 310, and antenna-dependent signal processors 312-1, 312-2, and 312-3. The constitutions of the user-dependent signal processor 211a and the sub-carrier assignment section 215 are similar to those of the fourth embodiment (FIG. 12); hence, they are designated by the same reference numerals, and the description thereof will be omitted.

The antenna-dependent signal processor 312-1 (similar to the antenna-dependent signal processors 312-2 and 312-3) performs signal processing with respect to a prescribed transmission antenna.

The antenna-dependent signal processor 312-1 includes a weighted multiplication section 319, an IFFT section 16, a parallel-series conversion section 17, a GI imparting section 18, a filter 21, and a D/A converter 22. Functions of the IFFT section 16, the parallel-series conversion section 17, the GI imparting section 18, the filter section 21, and the D/A converter 22 are identical to those of the first embodiment; hence, they are designated by the same reference numerals, and the description thereof will be omitted.

The weighted multiplication section 319 performs weighted multiplication on the output of the sub-carrier assignment section 215 with respect to sub-carriers, and outputs the results to the IFFT section 16. Both the antenna-dependent signal processors 312-2 and 312-3 have a constitution similar to that of the antenna-dependent signal processor 312-1.

The outputs of the antenna-dependent signal processors 312-1, 312-2, and 312-3 are supplied to a wireless frequency converter (not shown) for performing frequency conversion into wireless frequencies, from which the results are supplied to transmission antennas, thus outputting wireless signals.

A specific sub-carrier is used in a certain chunk. That is, it is used in either the frequency diversity region or the multiuser diversity region. The weighted multiplication section 319 is informed of the determination as to whether to use either the frequency diversity region or the multiuser diversity region from the high-order layer controlling the physical layer, based on which phase rotation $\theta_m$ is introduced in order to apply different delay times to antennas in the frequency diversity region, while multiplication using a weight $w_m$ is performed in order to perform directivity control in the multiuser diversity region.

A delay imparting and directivity control section 320 is constituted by the weighted multiplication section 319 and the IFFT section 16. When phase rotation is introduced by means of the weighted multiplication section 319, it is regarded as a time at the output of the IFFT section 16 since the IFT section 16 performs frequency-time conversion. On the other hand, when the weighted multiplication section performs multiplication using the weights $w_m$, the IFFT section 16 performs frequency-time conversion so that the output of the IFFT section 16 output from the transmission antenna is subjected to directivity control.

When the weighted multiplication section 319 rotates the phase by $\theta_m$, similar to the fourth embodiment, it sets $\theta_m = 2\pi f_m \cdot (n-1)T$. Herein, $f_m$ denotes a frequency difference between the 0-th sub-carrier and the m-th sub-carrier, wherein $f_m = m/T_s$; and $(n-1)T$ represent a circulating delay time at an n-th antenna in connection with a first antenna. $T_s$ represents a valid symbol time for an OFDM symbol.

In order to perform multiplication using the weight $w_m$, the following weight is set up so as to perform directivity control. Assuming a linear array of n antennas whose distance is a half of a wavelength of a carrier frequency, the weight $w_m$ is calculated in accordance with the following equation (1):

[Equation 1]

$$w_m = \frac{1}{\sqrt{n}} \{e^{jk\pi\sin\theta(0-\frac{n-1}{2})}, e^{jk\pi\sin\theta(1-\frac{n-1}{2})}, \ldots, e^{jk\pi\sin\theta((n-1)-\frac{n-1}{2})}\} \quad (1)$$

The weight $w_m$ represents a vector of a weight used in the weighted multiplication section 319, wherein in the equation (1), the first to last terms describe the weights used in first to n-th antennas.

In the equation (1) expressing the weight $w_m$, n denotes the number of antennas, wherein in the present embodiment, n=3; θ denotes a direction in which a main beam is directed; and k denotes a ratio between the frequency used for transmission and the frequency that is measured based on θ.

With respect to the main beam direction θ, a measured value produced by the wireless transmission device or a terminal of a counter-communicator is supplied to the weight calculation section 310, in which it is used for calculation of the weight $w_m$. The equation (1) presents an example of calculation for the weight $w_m$, which can be calculated by way of another method. The calculation methods regarding θ and $w_m$ are described in "Technical Report RCS2004-229" (published by the Corporate Institute of Electronic Information and Telecommunication on November, 2004) and the like.

The delay imparting and directivity control section 320 imparts a delay of the maximum delay time (n−1)T or less between transmission antennas when the communication signal indicates frequency diversity, while it performs multiplication to produce the weight $w_m$ so as to perform directivity control when the communication signal indicates multiuser diversity.

As described in the first embodiment, the delay imparting and directivity control section 320 sets the delay time T such that the maximum delay time (n−1)T between transmission antennas falls within a range of (n−1)T>1/$F_c$ when the communication signal indicates frequency diversity.

As described in the first embodiment, the delay imparting and directivity control section 320 sets the delay time T such that the maximum delay time (n−1)T falls within a range of (n−1)T>1/BW when the communication signal indicates frequency diversity.

The aforementioned description teaches that the weighted multiplication section 319 of the delay imparting and directivity control section 320 is instructed by the high-order layer controlling the physical layer to use either the frequency diversity region or the multiuser diversity region, based on which it applies a phase rotation $\theta_m$ so as to impart different delay times to antennas in the frequency diversity region, while it performs multiplication to produce the weight $w_m$ so as to perform directivity control in the multiuser diversity region; however, it is possible to use another method for using both the phase rotation $\theta_m$ and weight $w_m$ in the multiuser diversity region in such a way that, as described in the fourth embodiment, the phase rotation $\theta_m$ is imparted with respect to both the frequency diversity region and the multiuser diversity region before the main beam direction θ is produced, and then the directivity control is performed using the weight $w_m$ after the main beam direction θ is produced in the multiuser diversity region. Similar to the fourth embodiment, the delay time T varies in connection with $\theta_m$ in accordance with the frequency diversity region and the multiuser diversity region. Thus, in the stage before the main beam direction θ is produced, it is possible to produce the same multiuser diversity effect as the fourth embodiment, while after the main beam direction θ is produced, it is expected to produce a higher multiuser diversity effect by strictly performing directivity control using the weight $w_m$. Furthermore, by using the configuration of the physical layer of the wireless transmission device shown in FIG. 13 rather than the fourth embodiment, it is possible to realize the improvement of characteristics due to the directivity control by slightly increasing the circuit constitution.

As described above, the delay imparting and directivity control section 320 imparts a delay of the maximum delay time (n−1)T or less between transmission antennas when the communication signal indicates frequency diversity, while it imparts a delay of the maximum delay time (n−1)T or less between transmission antennas, or it performs multiplication to produce the weight $w_m$ so as to perform directivity control when the communication signal indicates multiuser diversity.

The wireless transmission device performing the aforementioned processing has the constitution shown in FIG. 13, wherein, when the communication signal indicates the multiuser diversity, the delay imparting and directivity control section imparts a delay of the maximum delay time (n−1)T or less between transmission antennas, or it performs multiplication to produce the weight $w_m$ so as to perform directivity control.

As described in the first embodiment, the delay imparting and directivity control section sets the delay time T such that the maximum delay time (n−1)T between transmission antennas falls within a range of (n−1)T>1/$F_c$ when the communication signal indicates frequency diversity, while it sets the delay time T such that the maximum delay time falls within a range of (n−1)T<1/$F_c$ when the communication signal indicates multiuser diversity so that a delay is applied between transmission antennas.

As described in the first embodiment, the delay imparting and directivity control section sets the delay time T such that the maximum delay time (n−1)T between transmission antennas falls within a range of (n−1)T>1/BW when the communication signal indicates the frequency diversity.

The aforementioned second to fifth embodiments are described with respect to the case in which the number of users is two and the number of antennas is three, whereas the number of users and the number of antennas are not necessarily limited to these numbers.

In the aforementioned fourth and fifth embodiments, it is possible to transmit signals, which are subjected to multiplication using specific scramble codes dependent upon antennas, sectors, and base stations, to transmission antennas.

Sixth Embodiment

The present embodiment will be described with respect to variations of the maximum delay time (n−1)T dependent upon physical channels. The aforementioned first to fifth embodiments are described under the presumption that one-to-one communication is performed with regard to one certain chunk at certain instant, wherein (n−1)T>1/$F_c$ is set to produce the frequency diversity effect, while (n−1)T<1/$F_c$ is set to produce the multiuser diversity effect.

Normally, in communications other than one-to-one communication, a known signal referred to as a pilot channel is transmitted to a wireless transmission device in order to estimate a propagation path; alternatively, a control channel is used to inform various types of parameters before data communication. The present embodiment will be described with respect to a setup method of the maximum delay time (n−1)T in theses physical channels.

In Evolved UTRA & UTRAN examined in 3GPP (3rd Generation Partnership Project), there are provided common pilot channels DCPCH (Downlink Common Pilot Channel), dedicated pilot channels DDPCH (Downlink Dedicated Pilot Channel), downlink synchronization channels DSCH (Downlink Synchronization Channel), common control channels DCCCH (Downlink Common Control Channel), downlink shared control signaling channels DSCSCH (Downlink Shared Control Channel), and multicast/broadcast channels (Multicast/Broadcast Channel).

Common pilot channels DCPCH correspond to pilot channels CPICH in W-CDMA (Wideband Code Division Multiple Access), which are used for the estimation of conditions of downlink propagation paths, cell search, and measurement of losses of propagation paths in uplink transmission power control in AMCS (Adaptive Modulation and Coding Scheme).

Dedicated pilot channels DDPCH are used to perform transmission toward individual mobile stations via transmission antennas such as adaptive array antennas whose propagation paths (directivities) differ from those of cell shared antennas; alternatively, they can be used for the purpose of reinforcing downlink shared common pilot channels DSPCH in connection with mobile stations having low reception qualities.

Downlink synchronization channels DSCH correspond to synchronization channels SCH in W-CDMA, wherein they are used for cell search of mobile stations, wireless frames of OFDM (Orthogonal Frequency Division Multiplexing) signals, time slots, transmission timing intervals TTI (Transmission Timing Interval), and OFDM symbol timing synchronization.

Common control channels DCCCH include common control information such as broadcast information (corresponding to broadcast channels BCH) corresponding to primary common control physical channels P-CCPCH, secondary common control physical channels S-CCPCH, and paging indicator channels PICH in W-CDMA, packet paging indicator PI information (corresponding to paging indicator channels PICH) designating occurrence of packet calls, packet paging information (corresponding to paging channels PCH) corresponding to packet calls, and downlink access information (corresponding to downlink access channels FACH).

Downlink shared control signaling channels DSCSCH correspond to HS-DSCH connected shared control channels HS-SCCH, downlink dedicated control channels DPCCH, acquisition indicators AICH included in high-speed physical downlink shared channels HS-PDSCH in HSPDA (High Speed Downlink Packet Access), wherein they are shared by plural mobile stations and are used for transmission of the information (modulation methods, spread coding, etc.) that is necessary for mobile stations to perform demodulation with regard to high-speed downlink shared channels HS-DSCH, the information that is necessary for error correcting decoding and HARQ processing, and the scheduling information of wireless resources (frequency, time).

Downlink shared data channels DSDCH correspond to high-speed downlink shared channels HS-DSCH and downlink dedicated data channels DPDCH included in high-speed physical downlink shared channels HS-PDSCH in HSPDA, wherein they are used for transmission of packet data towards mobile stations from high-order layers.

Multicast/broadcast channels are used for the broadcasting of information signals.

The aforementioned physical channels of W-CDMA and HSDPA are described in "Tachikawa Keiji, W-CDMA Mobile Communication Method, ISBN4-621-04894-5" and the like.

FIG. 14 and FIG. 15 are tables describing the relationships between the maximum delay time (n−1)T between transmission antennas and the frequency bandwidth $F_c$ of chunks in connection with physical channels. As shown in the figures, it is preferable to set $(n-1)T<1/F_c$ irrespective of the frequency diversity region and the multiuser diversity region with respect to common control pilot channels, common control channels, and dedicated control channels. It is preferable to set $(n-1)T>1/F_c$ irrespective of the frequency diversity region and the multiuser diversity region with respect to downlink synchronization channels.

With respect to dedicated pilot channels, it is preferable to set $(n-1)T>1/F_c$ in the frequency diversity region and to set $(n-1)T<1/F_c$ in the multiuser diversity region. Suppose that dedicated pilot signals are transmitted via transmission antennas, wherein the delay imparting section for delaying transmission signals supplied to n transmission antennas by the maximum delay time (n−1)T or less sets the delay time T such that the maximum delay time (n−1)T falls within a range of $(n-1)T>1/F_c$ when a communication signal, which indicates whether chunks including dedicated pilot channels are subjected to the frequency diversity transmission or the multiuser diversity transmission, indicates frequency diversity, while it sets the delay time T so as to perform directivity control using weights output from the weight calculation section or to define the maximum delay time (n−1)T as $(n-1)T<1/F_c$ when the communication signal indicates multiuser diversity.

Multicast/broadcast channels are used in the frequency diversity region only; hence, it is preferable to set $(n-1)T>1/F_c$.

The reasons why the aforementioned setups are performed are that common pilot channels are used for the notification of signal intensities observed by terminals, hence, it is undesirable that the delay time varies with respect to chunks, while it is necessary for the wireless transmission device to know signal intensities with respect to chunks in case of $(n-1)T<1/F_c$ in order to perform multiuser diversity, hence, it is preferable to set $(n-1)T<1/F_c$ in order that the maximum delay time does not vary with respect to chunks.

Dedicated pilot channels are used for calculations of estimated values of propagation paths used for demodulation of data signals. Therefore, it is preferable to perform communication by setting $(n-1)T>1/F_c$ in the frequency diversity region and by setting $(n-1)T<1/F_c$ in the multiuser diversity region.

Downlink synchronization channels are used for frame synchronization, wherein the estimation of propagation paths is not necessary, and it is preferable to secure accurate reception in case of low reception power; hence, it is preferable to set $(n-1)T>1/F_c$ in order to produce the frequency diversity effect. In particular, there is a possibility that the same signal is transmitted using the same time and the same frequency via downlink synchronization channels by way of plural sectors and plural antennas included in a single base station. Therefore, signals are applied with different delays with respect to antennas and are transmitted by way of plural sectors and plural antennas included in a single base station via downlink synchronization channels; thus, it is expected to produce a high frequency diversity effect, which is higher than that of another physical channel.

It is presumed that common control channels and dedicated control channels use estimated values of propagation paths, which are produced by way of common pilot channels; hence, it is preferable that they be set to the maximum delay time, which is identical to that of the common pilot channels, and be subjected to transmission.

However, it is preferable to secure accurate reception in common control channels and dedicated control channels in case of low reception power; hence, it is preferable to produce the frequency diversity effect, wherein, in consideration of improvement of reception performance of control channels at first, when common control channels, dedicated control channels, and multicast/broadcast channels are included in the same chunk, it is preferable to perform transmission via common pilot channels by setting $(n-1)T>1/F_c$, thus producing the frequency diversity effect in control channels.

When the same chunk is used for the multiuser diversity, it is necessary to perform notification about signal intensities emerging in actual transmission suited to the multiuser diversity (communication under $(n-1)T<1/F_c$); hence, it is preferable to perform transmission by setting $(n-1)T<1/F_c$.

For this reason, it is possible to set the relationship between the maximum delay time $(n-1)T$ between transmission antennas and the frequency bandwidth $F_c$ of the chunk, which is identical to the relationship shown in FIG. 15, with respect to each physical channel.

In order to produce the frequency diversity effect, it is preferable to perform communication by setting $(n-1)T>1/F_c$.

The aforementioned embodiment is described such that the maximum delay time falls within a range of $(n-1)T<1/F_c$ in the multiuser diversity region, whereas, the wireless transmission device described in the fifth embodiment can use the weight $w_m$, which is produced by the weight calculation section 310, in the multiuser diversity region.

The aforementioned second to fifth embodiments are each described such that the wireless transmission device having n transmission antennas transmits signals applied with a prescribed delay time with respect to each of n transmission antennas; but this constitution is not restrictive. For example, when the wireless transmission device having n transmission antennas selects using the multiuser diversity, it is possible to transmit signals applied with a prescribed delay time T' with respect to each of j transmission antennas (where j is an integer, $1 \leq j < n$) within n transmission antennas.

In the aforementioned constitution compared with the constitution in which signals are transmitted using all the n transmission antennas, a maximum delay time $(j-1)T'$ applied to signals transmitted via j transmission antennas decreases so as to further reduce variations of propagation paths; hence, it is possible to produce a good multiuser diversity effect. In case of $j=1$, in particular, it is possible to reduce the circuit scale of the delay section.

The present embodiment is described under the precondition that the maximum delay time is set as $(n-1)T>1/F_c$ in order to produce the frequency diversity effect, whereas, as described in the first embodiment, when transmission is performed using a physical channel, which is assigned with chunks lying in plural frequency directions, the bandwidth BW assigned to the physical channel forms the basis for producing the frequency diversity effect; hence, it is possible to produce the frequency diversity effect by setting the maximum delay time to $(n-1)T>1/BW$.

By use of the wireless transmission device, according to the aforementioned embodiments of the present invention, which selects the use of either the frequency diversity or the multiuser diversity in transmission of signals from n transmission antennas so as to vary delay times applied to signals transmitted via n transmission antennas on the basis of the selection result; hence, it is possible to produce the frequency diversity effect or the multiuser diversity effect without being affected by conditions of propagation paths.

In the aforementioned embodiments, programs realizing functions of the error correcting coding section 13, the modulator 14, the sub-carrier assignment sections 15 and 215, the IFFT section 16, the parallel-series conversion section 17, the GI imparting section 18, the delay imparting sections 19-1 to 19-3, the circulating delay imparting sections 119-1 to 119-3, the mixing section 20, the filter 21, the D/A converter 22, the phase rotation section 219, the weight calculation section 310, and the weighted multiplication section 319 shown in FIGS. 8, 10, 12, and 13 are stored in computer-readable storage media, so that the programs stored in the storage media are loaded into a computer system and are then executed so as to control the wireless transmission device. Herein, the computer system includes OS and the hardware such as peripheral devices.

The computer-readable recording media are referred to as flexible disks, magneto-optical disks, ROM, portable media such as CD-ROM, and storage devices such as hard disks incorporated in the computer system. Furthermore, the computer-readable storage media embrace media for dynamically retaining programs in a short period of time, such as communication lines such as the Internet, networks, and telephone lines used for transmitting programs as well as volatile memories for retaining programs for a prescribed period of time, which are incorporated in the computer system serving as the server and client. The aforementioned programs are designed to realize a part of the aforementioned functions; alternatively, they are designed to realize the aforementioned functions by way of the combination with programs that are stored in the computer system in advance.

This invention is described in detail by way of the embodiments with reference to the drawings, wherein the detailed constitution thereof is not necessarily limited to the embodiments; hence, it embraces designs that do not deviate from the spirit of this invention.

INDUSTRIAL APPLICABILITY

The present invention is applicable to wireless transmission devices and wireless transmission methods, which transmit signals to wireless reception devices by use of plural transmission antennas, wherein delay times are appropriately set based on the determination as to whether transmission signals are subjected to frequency diversity transmission or multiuser diversity transmission; hence, it is possible to produce frequency diversity effects and multiuser diversity effects without being affected by conditions of propagation paths.

The invention claimed is:

1. A transmission control method adapted to a transmission system in which slots are assigned to chunks divided in a frequency domain and in a time domain, said transmission control method comprising the steps of:
imparting delays to signals being supplied to a plurality of transmission antennas;
and
controlling the delays in response to using either a frequency diversity for transmitting the signals or a multiuser diversity for transmitting the signals such that a maximum delay time among the plurality of transmission antennas is set selectively to either a first value smaller than 1/Fc or a second value larger than 1/Fc where Fc denotes a frequency band width of each chunk.

2. The transmission control method according to claim 1, wherein a directivity control is performed in the multiuser diversity for transmitting the signals.

3. The transmission control method according to claim 1, wherein the maximum delay time among the plurality of transmission antennas is set to the first value smaller than 1/Fc when using frequency diversity for transmitting the signals, and
wherein the maximum delay time among the plurality of transmission antennas is set to the second value larger than 1/Fc when using multiuser diversity for transmitting the signals.

4. The transmission control method according to claim 1, wherein the maximum delay time among the plurality of transmission antennas is set to the first value smaller than 1/Fc when using frequency diversity for transmitting the signals.

5. The transmission control method according to claim 1, wherein the maximum delay time among the plurality of transmission antennas is set to the second value larger than 1/Fc when using multiuser diversity for transmitting the signals.

6. A transmission control method adapted to a transmission system in which slots are assigned to chunks divided in a frequency domain and in a time domain,
said transmission control method comprising the steps of:
determining whether to transmit signals using either frequency diversity or multiuser diversity based on a selection between using frequency diversity and multiuser diversity; and
controlling delays supplied to a plurality of transmission antennas in response to the determination of using either a frequency diversity for transmitting the signals or a multiuser diversity for transmitting the signals such that a maximum delay time among a plurality of transmission antennas is set selectively to either a first value smaller than 1/Fc or a second value larger than 1/Fc where Fc denotes a frequency bandwidth of each chunk.

7. The transmission control method according to claim 6, wherein a directivity control is performed in the multiuser diversity for transmitting the signals.

8. The transmission control method according to claim 6, wherein the maximum delay time among the plurality of transmission antennas is set to the first value smaller than 1/Fc when using frequency diversity for transmitting the signals, and
wherein the maximum delay time among the plurality of transmission antennas is set to the second value larger than 1/Fc when using multiuser diversity for transmitting the signals.

9. The transmission control method according to claim 6, wherein the maximum delay time among the plurality of transmission antennas is set to the first value smaller than 1/Fc when using frequency diversity for transmitting the signals.

10. The transmission control method according to claim 6, wherein the maximum delay time among the plurality of transmission antennas is set to the second value larger than 1/Fc when using multiuser diversity for transmitting the signals.

11. A transmission apparatus in a transmission system wherein slots are assigned to chunks divided in a frequency domain and in a time domain, the transmission apparatus comprising:
a plurality of transmission antennas;
a delay imparting section imparting delays to signals being supplied to the plurality of transmission antennas; and
a controller controlling the delays in response to using either a frequency diversity for transmitting the signals or a multiuser diversity for transmitting the signals such that a maximum delay time among the plurality of transmission antennas is set selectively to either a first value smaller than 1/Fc or a second value larger than 1/Fc where Fc denotes a frequency band width of each chunk.

12. The transmission apparatus according to claim 11, wherein a directivity control is performed in the multiuser diversity for transmitting the signals.

13. The transmission apparatus according to claim 11, wherein the maximum delay time among the plurality of transmission antennas is set to the first value smaller than 1/Fc when using frequency diversity for transmitting the signals, and
wherein the maximum delay time among the plurality of transmission antennas is set to the second value larger than 1/Fc when using multiuser diversity for transmitting the signals.

14. The transmission apparatus according to claim 11, wherein the maximum delay time among the plurality of transmission antennas is
set to the first value smaller than 1/Fc when using frequency diversity for transmitting the signals.

15. The transmission apparatus according to claim 11, wherein the maximum delay time among the plurality of transmission antennas is set to the second value larger than 1/Fc when using multiuser diversity for transmitting the signals.

16. A transmission system wherein slots are assigned to chunks divided in a frequency domain and in a time domain, the transmission system comprising:
a plurality of transmission antennas;
a receiving section receiving a determination of whether to transmit signals using either frequency diversity or multiuser diversity based on a selection between using frequency diversity and multiuser diversity; and
a controller controlling delays supplied to the plurality of transmission antennas in response to the determination of using a frequency diversity for transmitting the signals or a multiuser diversity for transmitting the signals such that a maximum delay time among a plurality of transmission antennas is set selectively to either a first value smaller than 1/Fc or a second value larger than 1/Fc where Fc denotes a frequency bandwidth of each chunk.

17. The transmission system according to claim 16, wherein a directivity control is performed in the multiuser diversity for transmitting the signals.

18. The transmission system according to claim 16, wherein the maximum delay time among the plurality of transmission antennas is set to the first value smaller than 1/Fc when using frequency diversity for transmitting the signals, and
wherein the maximum delay time among the plurality of transmission antennas is set to the second value larger than 1/Fc when using multiuser diversity for transmitting the signals.

19. The transmission system according to claim 16, wherein the maximum delay time among the plurality of transmission antennas is set to the first value smaller than 1/Fc when using frequency diversity for transmitting the signals.

20. The transmission system according to claim 16, wherein the maximum delay time among the plurality of transmission antennas is set to the second value larger than 1/Fc when using multiuser diversity for transmitting the signals.

* * * * *